United States Patent
Ahn et al.

(10) Patent No.: US 11,481,965 B2
(45) Date of Patent: Oct. 25, 2022

(54) ELECTRONIC DEVICE FOR COMMUNICATING IN AUGMENTED REALITY AND METHOD THEREOF

(71) Applicant: Samsung Electronics Co., Ltd., Suwon-si (KR)

(72) Inventors: Stephanie Kim Ahn, Mountain View, CA (US); Aaron Samuel Faucher, Mountain View, CA (US); Andrew R McHugh, Mountain View, CA (US); Edgar Charles Evangelista, Mountain View, CA (US); Jaehyun Kim, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/222,335

(22) Filed: Apr. 5, 2021

(65) Prior Publication Data

US 2021/0319617 A1 Oct. 14, 2021

Related U.S. Application Data

(60) Provisional application No. 63/008,618, filed on Apr. 10, 2020.

(30) Foreign Application Priority Data

May 26, 2020 (KR) .......................... 10-2020-0063058

(51) Int. Cl.
*G06T 15/20* (2011.01)
*H04M 1/72439* (2021.01)
*G06F 3/16* (2006.01)

(52) U.S. Cl.
CPC ....... *G06T 15/205* (2013.01); *H04M 1/72439* (2021.01); *G06F 3/167* (2013.01); *G06T 2200/24* (2013.01)

(58) Field of Classification Search
None
See application file for complete search history.

(56) References Cited

U.S. PATENT DOCUMENTS 8,938,677 B2 1/2015 Geppert et al.
9,310,559 B2 4/2016 Macnamara
(Continued)

FOREIGN PATENT DOCUMENTS

JP 2017-529635 A 10/2017
KR 10-2010-0109518 A 10/2010
(Continued)

OTHER PUBLICATIONS

International Search Report dated Jul. 22, 2021, issued in International Application No. PCT/KR2021/004277.

*Primary Examiner* — Nurun Flora
(74) *Attorney, Agent, or Firm* — Jefferson IP Law, LLP

(57) ABSTRACT

An augmented reality (AR) device supporting an AR is provided. The AR device includes a display, a communication circuit, at least one processor operatively connected to the display and the communication circuit, and a memory operatively connected to the at least one processor. The memory stores instructions that, when executed, cause the at least one processor to establish a connection with a user device storing a contact application and a message application, through the communication circuit, detect that the message application is executed, and display a first graphic user interface (GUI) and at least one avatar, which is disposed at a location adjacent to the first GUI and corresponds to at least one contact associated with the contact application or the message application, through the display in the AR.

20 Claims, 25 Drawing Sheets

(56) References Cited

U.S. PATENT DOCUMENTS

| | | |
|---|---|---|
| 9,325,661 B2 | 4/2016 | Geppert et al. |
| 9,348,143 B2 | 5/2016 | Gao et al. |
| 9,417,452 B2 | 8/2016 | Schowengerdt et al. |
| 9,429,752 B2 | 8/2016 | Schowengerdt et al. |
| 10,165,261 B2 | 12/2018 | Valdivia et al. |
| 10,431,004 B2 | 10/2019 | Yoon et al. |
| 10,432,559 B2 | 10/2019 | Baldwin et al. |
| 10,511,833 B2 | 12/2019 | Valdivia et al. |
| 10,536,691 B2 | 1/2020 | Valdivia et al. |
| 10,540,797 B1* | 1/2020 | Goslin ............... A63F 13/67 |
| 10,602,133 B2 | 3/2020 | Valdivia et al. |
| 10,838,587 B2 | 11/2020 | Tippana |
| 10,880,246 B2 | 12/2020 | Baldwin et al. |
| 2010/0251158 A1 | 9/2010 | Geppert et al. |
| 2015/0135098 A1 | 5/2015 | Geppert et al. |
| 2016/0093108 A1* | 3/2016 | Mao ................. A63F 13/825 |
| | | 345/633 |
| 2016/0335801 A1 | 11/2016 | Yoon et al. |
| 2016/0357252 A1* | 12/2016 | Gavriliuc ............ G06F 3/167 |
| 2017/0214782 A1* | 7/2017 | Brinda ............ H04M 1/72439 |
| 2017/0236330 A1* | 8/2017 | Seif ................. G06F 3/0202 |
| | | 345/633 |
| 2018/0095635 A1 | 4/2018 | Valdivia et al. |
| 2018/0157333 A1* | 6/2018 | Ross ................... H04L 67/38 |
| 2018/0204380 A1* | 7/2018 | Kumar ................ G06F 3/011 |
| 2019/0204994 A1 | 7/2019 | Tippana |
| 2019/0362516 A1* | 11/2019 | Suzuki .................. G06T 7/70 |
| 2019/0362557 A1* | 11/2019 | Lacey ................. G06F 3/012 |
| 2020/0249749 A1 | 8/2020 | Akman ............... G06T 17/05 |
| 2021/0089117 A1* | 3/2021 | Bodolec ............. G09G 5/14 |
| 2021/0258354 A1 | 8/2021 | Kim et al. |

FOREIGN PATENT DOCUMENTS

| | | | |
|---|---|---|---|
| KR | 10-2016-0019279 A | | 2/2016 |
| KR | 101856940 | * | 5/2018 |
| KR | 10-2019-0104821 A | | 9/2019 |
| KR | 10-2020-0023858 A | | 3/2020 |
| KR | 10-2233700 B1 | | 3/2021 |

* cited by examiner

ELECTRONIC DEVICE FOR COMMUNICATING IN AUGMENTED REALITY AND METHOD THEREOF

CROSS-REFERENCE TO RELATED APPLICATION(S)

This application is based on and claims priority under 35 U.S.C. § 119(e) of a U.S. Provisional application Ser. No. 63/008,618, filed on Apr. 10, 2020, in the U.S. Patent and Trademark Office, and under 35 U.S.C. § 119(a) of a Korean patent application number 10-2020-0063058, filed on May 26, 2020, in the Korean Intellectual Property Office, the disclosure of which is incorporated by reference herein in its entirety.

BACKGROUND

1. Field

The disclosure relates to a technology for communication in augmented reality (AR). More particularly, the disclosure relates to an AR device including a display, a communication circuit, and at least one processor operatively connected to the display and the communication circuit, and a memory operatively connected to the at least one processor.

2. Description of Related Art

As an AR device, such as a wearable device or a head mounted display (HMD) is developed technologically, a user may experience AR. For example, the AR device may display a user interface (UI), such as an icon or an execution screen of an application in a real world to which the user belongs.

The above information is presented as background information only to assist with an understanding of the disclosure. No determination has been made, and no assertion is made, as to whether any of the above might be applicable as prior art with regard to the disclosure.

SUMMARY

To experience an augmented reality (AR), a user needs to wear an AR device. Even while wearing the AR device, the user needs to launch an application of a user device, such as a smartphone. For example, the user needs to communicate with family, friends, or acquaintances by launching a message application installed in the user device while the user wears the AR device.

Therefore, a need exists for an AR device including a display, a communication circuit, and at least one processor operatively connected to the display and the communication circuit, and a memory operatively connected to the at least one processor.

Aspects of the disclosure are to address at least the above-mentioned problems and/or disadvantages and to provide at least the advantages described below. Accordingly, an aspect of the disclosure is to provide a technology for communication in AR.

Additional aspects will be set forth in part in the description which follows and, in part, will be apparent from the description, or may be learned by practice of the presented embodiments.

In accordance with an aspect of the disclosure, an AR device supporting an AR is provided. The AR device includes a display, a communication circuit, at least one processor operatively connected to the display and the communication circuit, and a memory operatively connected to the at least one processor. The memory may store instructions that, when executed, cause the at least one processor to establish a connection with a user device storing a contact application and a message application, through the communication circuit, to detect that the message application is executed, and to display a first graphic user interface (GUI) and at least one avatar, which is disposed at a location adjacent to the first GUI and corresponds to at least one contact associated with the contact application or the message application, through the display in the AR.

In accordance with another aspect of the disclosure, an AR system supporting an AR is provided. The AR system includes an AR device and a user device. The AR device may include a first display and a first communication circuit. The user device may include a second display, a second communication circuit, at least one processor operatively connected to the second display and the second communication circuit, and a memory operatively connected to the at least one processor. The memory may store at least one contact associated with a message application or a contact application. The memory may store instructions that, when executed, cause the at least one processor to establish a connection with the AR device through the second communication circuit, to detect that the message application is executed, to render a first GUI and at least one avatar, which are to be displayed in the AR through the first display, as a 3 dimensional (3D) image, and to transmit the rendered first GUI and the rendered at least one avatar to the AR device through the second communication circuit. The at least one avatar may correspond to the at least one contact.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary sill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
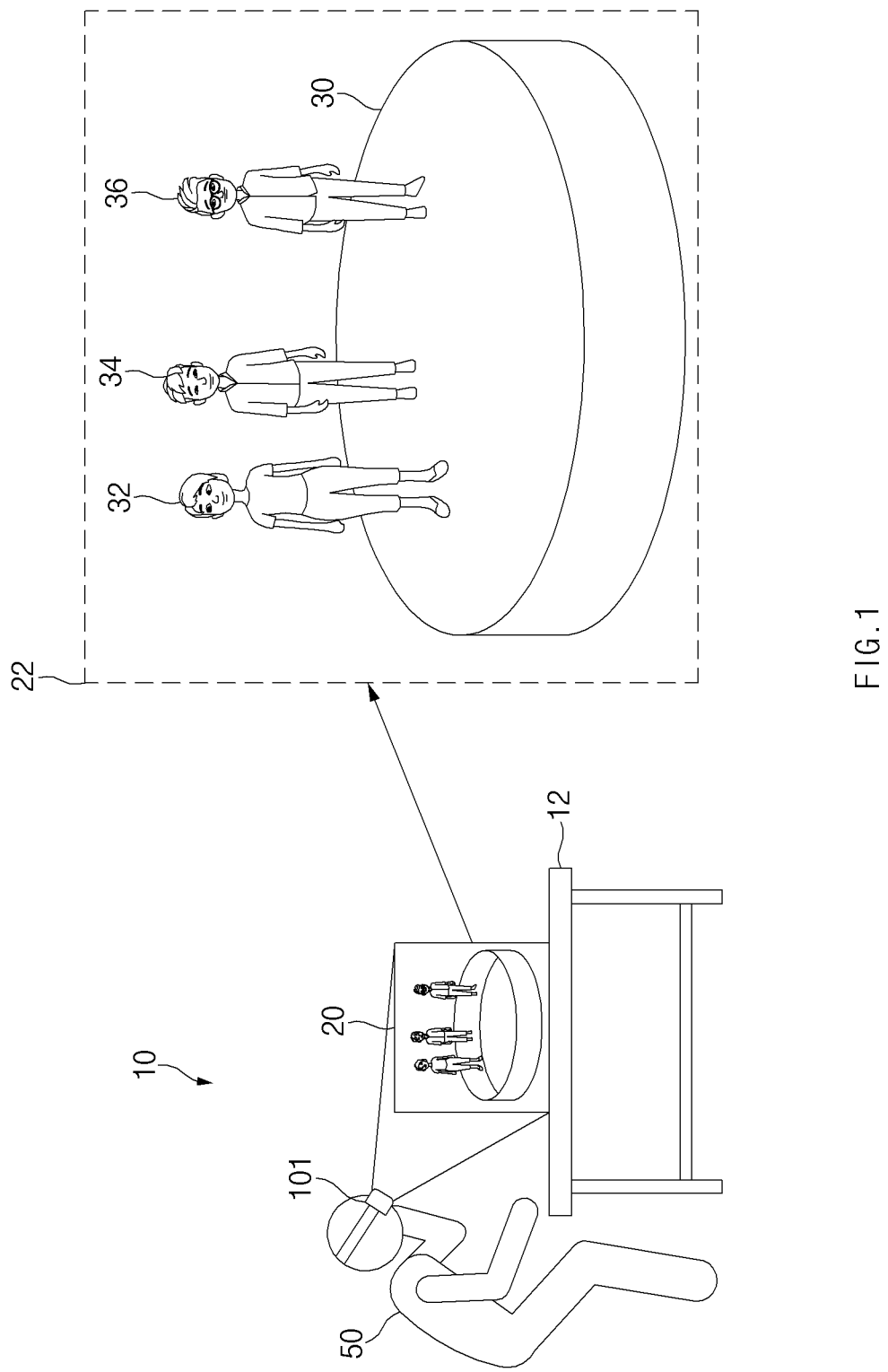
FIG. 1 illustrates a graphic user interface (GUI) and an avatar, which are displayed on an augmented reality according to an embodiment of the disclosure.

FIG. 1 illustrates a GUI and an avatar, which are displayed in an AR according to an embodiment of the disclosure.

Referring to FIG. 1, in a real space 10, an AR device 101 may be worn on a part (e.g., a head) of a body of a user 50. The AR device 101 may refer to a device including a display capable of supporting an AR. For example, the AR device 101 may include at least one of a wearable device and a head mounted display (HMD).

According to an embodiment of the disclosure, the AR device 101 may output a first GUI 30 for displaying a contact stored in a message application or a contact application of a user device (e.g., a smartphone, not illustrated) in 3 dimensional (3D) in an AR 20. For example, the first GUI 30 may be referred to as a 'nest'.

According to an embodiment of the disclosure, the first GUI 30 may be fixed in a specified area of the real space 10. For example, when a user input for placing the first GUI 30 on a table 12 of the real space 10 is received, the AR device 101 may display the first GUI 30 on the table 12. In this case, even though the AR device 101 moves by a movement of the user 50, a location of the first GUI 30 may not be changed in the real space 10. According to another embodiment of the disclosure, the first GUI 30 may be fixed to a specified location of an area (e.g., a viewing area 1510 of FIG. 15A) that the user 50 is capable of viewing through the AR device 101. In this case, when the AR device 101 moves by the movement of the user 50, the first GUI 30 may move together with the movement of the AR device 101.

The first GUI 30 may include at least one avatar (e.g., 32, 34, or 36) corresponding to each contact stored in the user device. In this specification, it may be described that the first GUI 30 'includes' an avatar. However, according to various embodiments of the disclosure, the avatars 32, 34, and 36 in the AR 20 may be positioned at various locations adjacent to the first GUI 30. For example, referring to an enlarged view 22 in which the AR 20 is enlarged, the avatars 32, 34, and 36 may be disposed on the first GUI 30. As another example, although not illustrated in FIG. 1, the avatars 32, 34, and 36 may be disposed below, side, or inside the first GUI 30.

The avatars 32, 34, and 36 may represent contacts stored in the user device, respectively. According to embodiments of the disclosure, a user of the user device (or the AR device 101) may select one of template avatars that have been stored in advance, and thus an appearance of the avatars 32, 34, and 36 may be determined, an appearance of the avatars 32, 34, and 36 may be arbitrarily determined based on information (e.g., an age, a gender, or a country) included in contact information. Alternatively, an appearance of the avatars 32, 34, and 36 may be determined based on settings of a counterpart.

A size of the AR space 20 capable of being provided by the AR device 101 is restricted as compared to the number of contacts stored in the user device, and thus the AR device 101 according to an embodiment may display only an avatar corresponding to at least one pre-selected contact among contacts stored in the user device. For example, the AR device 101 may display, on the first GUI 30, a contact (e.g., "favorite") selected by user settings or a contact having a high frequency of communication.

Figure 2:
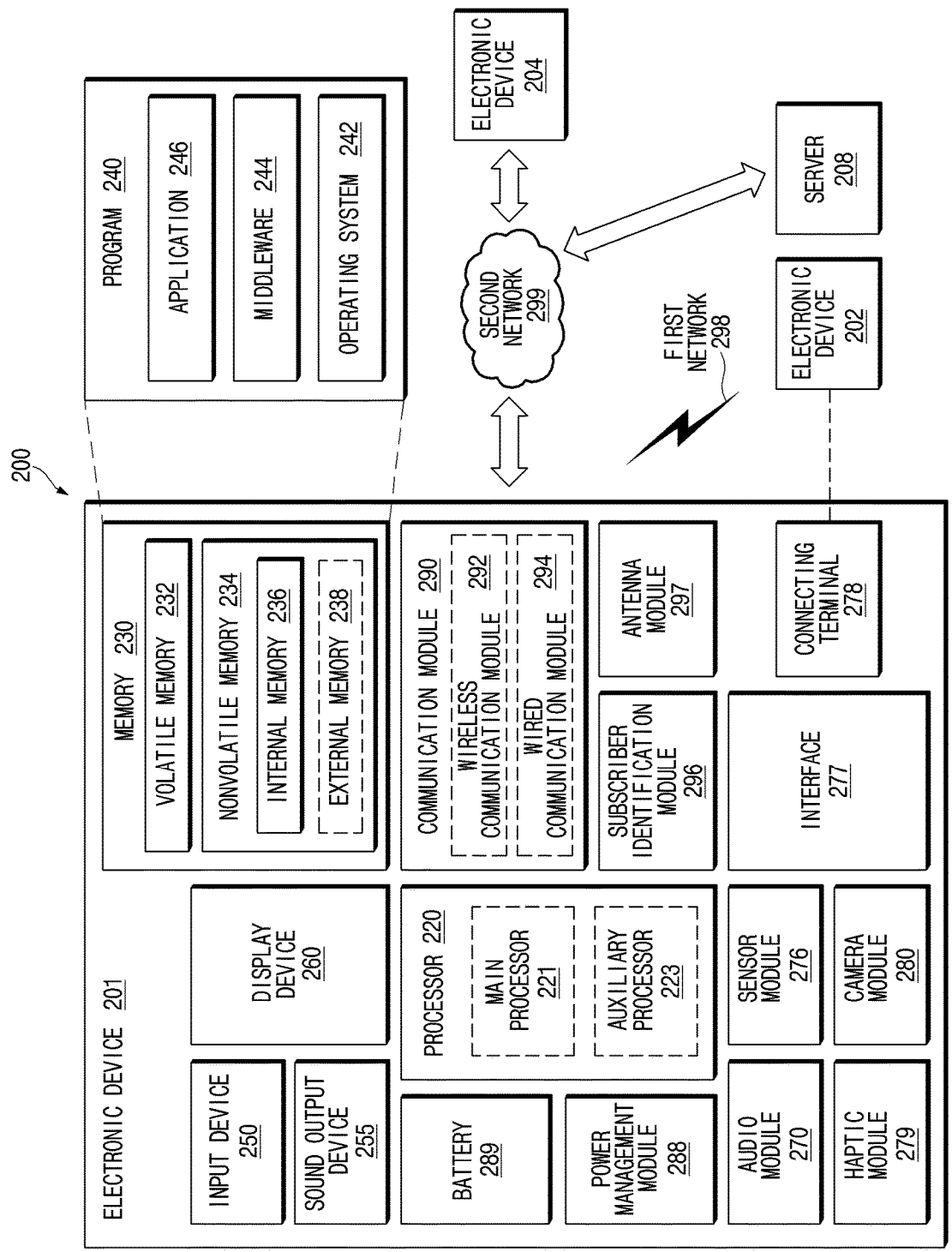
FIG. 2 illustrates a block diagram of an electronic device in a network environment according to an embodiment of the disclosure.

FIG. 2 illustrates a block diagram illustrating an electronic device in a network environment 200 according to an embodiment of the disclosure.

Referring to FIG. 2, an electronic device 201 in the network environment 200 may communicate with an external electronic device 202 via a first network 298 (e.g., a short-range wireless communication network), or at least one of an external electronic device 204 or a server 208 via a second network 299 (e.g., a long-range wireless communication network). According to an embodiment of the disclosure, the electronic device 201 may communicate with the external electronic device 204 via the server 208. According to an embodiment of the disclosure, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In an embodiment of the disclosure, at least one of the components (e.g., the connecting terminal 278) may be omitted from the electronic device 201, or one or more other components may be added in the electronic device 201. In an embodiment of the disclosure, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to one embodiment of the disclosure, as at least part of the data processing or computation, the processor 220 may store a command or data received from another component (e.g., the sensor module 276 or the communication module 290) in a volatile memory 232, process the command or the data stored in the volatile memory 232, and store resulting data in a non-volatile memory 234. According to an embodiment of the disclosure, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., a sleep) state, or together with the main processor 221 while the main processor 221 is in an active state (e.g., executing an application). According to an embodiment of the disclosure, the auxiliary processor 223 (e.g., an image signal processor or a communication processor) may be implemented as part of another component (e.g., the camera module 280 or the communication module 290) functionally related to the auxiliary processor 223. According to an embodiment of the disclosure, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thererto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment of the disclosure, the display module 260 may include a touch sensor adapted to detect a touch, or a pressure sensor adapted to measure the intensity of force incurred by the touch.

The audio module 270 may convert a sound into an electrical signal and vice versa. According to an embodiment of the disclosure, the audio module 270 may obtain the sound via the input module 250, or output the sound via the sound output module 255 or a headphone of an external electronic device (e.g., the external electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment of the disclosure, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the external electronic device 202) directly (e.g., wiredly) or wirelessly. According to an embodiment of the disclosure, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the external electronic device 202). According to an embodiment of the disclosure, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 279 may include, for example, a motor, a piezoelectric element, or an electric stimulator.

The camera module 280 may capture a still image or moving images. According to an embodiment of the disclosure, the camera module 280 may include one or more lenses, image sensors, image signal processors, or flashes.

The power management module 288 may manage power supplied to the electronic device 201. According to one embodiment of the disclosure, the power management module 288 may be implemented as at least part of, for example, a power management integrated circuit (PMIC).

The battery 289 may supply power to at least one component of the electronic device 201. According to an embodiment of the disclosure, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the external electronic device 202, the external electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment of the disclosure, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the external electronic device 204), or a network system (e.g., the second network 299). According to an embodiment of the disclosure, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment of the disclosure, the antenna module 297 may include an antenna including a radiating element including a conductive material or a conductive pattern formed in or on a substrate (e.g., a printed circuit board (PCB)). According to an embodiment of the disclosure, the antenna module 297 may include a plurality of antennas (e.g., array antennas). In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment of the disclosure, another component (e.g., a radio frequency integrated circuit (RFIC)) other than the radiating element may be additionally formed as part of the antenna module 297.

According to various embodiments of the disclosure, the antenna module 297 may form an mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 201 and the external electronic device 204 via the server 208 coupled with the second network 299. Each of the external electronic devices 202 or 204 may be a device of a same type as, or a different type, from the electronic device 201. According to an embodiment of the disclosure, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra-low-latency services using, e.g., distributed computing or mobile edge computing. In another embodiment of the disclosure, the external electronic device 204 may include an internet-of-things (IoT) device. The server 208 may be an intelligent server using machine learning and/or a neural network. According to an embodiment of the disclosure, the external electronic device 204 or the server 208 may be included in the second network 299. The electronic device 201 may be applied to intelligent services (e.g., smart home, smart city, smart car, or healthcare) based on 5G communication technology or IoT-related technology.

The electronic device 201 illustrated in FIG. 2 may be the AR device 101 of FIG. 1 or a device (e.g., a user device) that is electrically connected to the AR device 101 and stores contacts.

Figure 3:
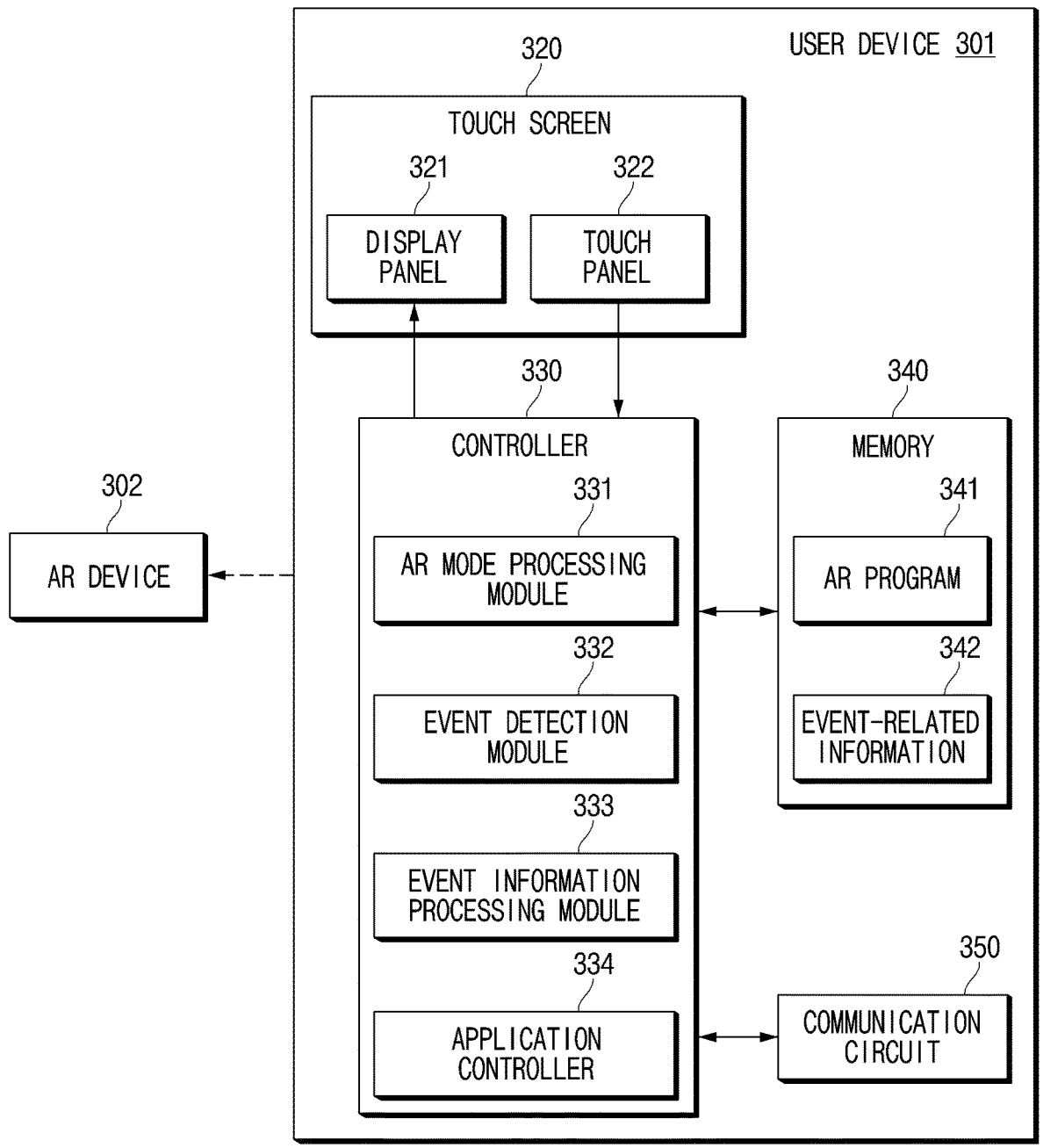
FIG. 3 illustrates a block diagram of a user device according to an embodiment of the disclosure.

FIG. 3 illustrates a block diagram of a user device according to an embodiment of the disclosure.

Referring to FIG. 3, a user device 301 may refer to a device configured to communicate with a counterpart stored in a message application or a contact application. For example, the user device 301 may include a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a moving picture experts group phase 1 or phase 2 (MPEG-1 or MPEG-2) audio layer 3 (MP3) player, a mobile medical device, or a home appliance.

An AR device 302 may be implemented as a wearable device (e.g., a HMD) capable of being worn by a user. The AR device 302 may include a display for providing an AR when the user device 301 operates in an AR mode. For example, when the user device 301 is mounted on the AR device 302, the user device 301 may execute the AR mode.

As another example, when the user device 301 is not mounted on the AR device 302, the user device 301 may execute the AR mode depending on user settings or execution of an application associated with the AR mode. When the AR mode is executed, the user device 301 may three-dimensionally render a GUI (e.g., the first GUI 30 and the avatars 32, 34, and 36 of FIG. 1) displayed in the AR through the AR device 302. In this case, two screens corresponding to the user's eyes (e.g., a left eye and a right eye) may be output through a display of the AR device 302.

The user device 301 may include a touch screen 320, a controller 330, a memory 340, and a communication circuit 350. As another example, the user device 301 may further include at least one of other components included in the electronic device 201 of FIG. 2.

The touch screen 320 may perform a function that is identical or similar to the function of the display module 260 of FIG. 2. The touch screen 320 may include a display panel 321 and/or a touch panel 322. Each of the display panel 321 and the touch panel 322 may be implemented as a separate panel. As another example, the touch screen 320 may include only the display panel 321 without including the touch panel 322.

The controller 330 may perform a function that is identical or similar to the function of the processor 220 of FIG. 2. The controller 330 may include an AR mode processing module 331, an event detection module 332, an event information processing module 333, and an application controller 334. Modules included in the controller 330 may mean configurations implemented by hardware or software. When implemented in software, the modules included in the controller 330 may be stored in the memory 340 as an instruction set. The controller 330 may perform operations of the user device 301 by executing the instruction set.

When the user device 301 operates in the AR mode, the AR mode processing module 331 may process operations associated with the AR mode. For example, the AR mode processing module 331 may load at least one AR program 341 stored in the memory 340.

The event detection module 332 may detect an event that occurs when the AR mode is operated. The event detection module 332 may determine whether there is information to be displayed on a screen associated with an event occurring when the AR mode is operated. For example, when content, such as a message is received from a counterpart's electronic device through a message application, the event detection module 332 may detect that an event occurs.

The event information processing module 333 may process information that is to be detected by the event detection module 332 and is to be displayed in an AR. For example, the event information processing module 333 may convert information (e.g., a text message) associated with a detected event into a 3D image to be displayed in the AR. In this case, the event information processing module 333 may convert two-dimensional (2D) information into information corresponding to left and right eyes, may synthesize the converted information, and may render the synthesized information to be displayed on the AR device 302.

The application controller 334 may control an application when the user device 301 operates in the AR mode. For example, when a message application is executed in the AR mode, the application controller 334 may block other applications or operate other applications in the background such that other applications do not interfere with execution of the message application.

The memory 340 may perform a function that is identical or similar to the function of the memory 230 of FIG. 2. The memory 340 may store the AR program 341 and event-related information 342. The AR program 341 may be an application associated with an AR mode operation of the user device 301. The event-related information 342 may include information associated with an event occurring in the AR.

The communication circuit 350 may perform a function that is identical or similar to the function of the communication module 190 of FIG. 2. The communication circuit 350 may be used to be electrically connected to the AR device 302 or an external server. For example, the communication circuit 350 may be connected to the AR device 302 through Bluetooth, Wi-Fi, or tethering. As another example, the communication circuit 350 may include a wired interface.

Figure 4:
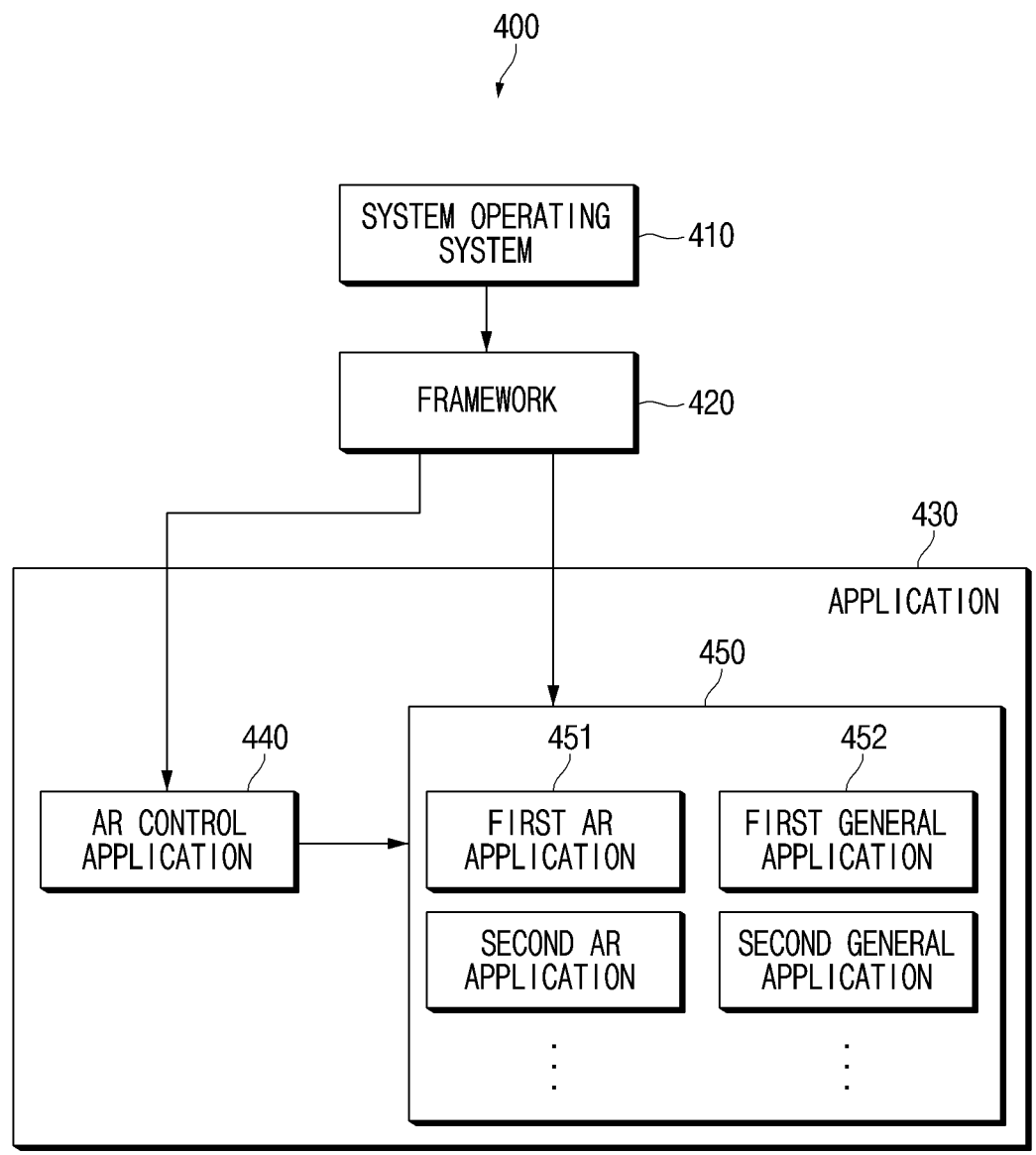
FIG. 4 is a block diagram of a program module according to an embodiment of the disclosure.

FIG. 4 is a block diagram of a program module according to an embodiment of the disclosure.

Referring to FIG. 4, a program module 400 may include a configuration that is identical or similar to that of the program 240 of FIG. 2. The program module 400 may include a system operating system (e.g., an operating system (OS)) 410, a framework 420, and an application 430.

The system operating system 410 may perform a function that is identical or similar to the function of the operating system 242 of FIG. 2. The system operating system 410 may include at least one system resource manager or at least one device driver. The system resource manager may control, allocate, or recover a system resource. The system resource manager may include at least one manager, such as a process manager, a memory manager, or a file system manager. The device driver may include at least one driver, such as a display driver, a camera driver, a Bluetooth driver, a shared memory driver, an USB driver, a keypad driver, a Wi-Fi driver, an audio driver, or an inter-process communication (IPC) driver.

For example, the framework 420 may include the middleware 244 of FIG. 2. The framework 420 may provide a function necessary for an application through an application programming interface (API) such that the application is capable of efficiently using limited system resources in an electronic device (e.g., the user device 301 in FIG. 3). When the electronic device operates in an AR mode, the framework 420 may control a function associated with the AR mode. For example, the framework 420 may control at least one AR application (e.g., a plurality of AR applications 451).

The application 430 may perform a function that is identical or similar to the function of the application 246 of FIG. 2. The application 430 may include a plurality of AR applications (e.g., the plurality of AR applications 451) and a plurality of general applications (e.g., 452). The AR application may refer to an application that operates in the AR mode, and, the general application may refer to an application that operates in a normal mode, not the AR mode.

According to an embodiment of the disclosure, the application 430 may further include an AR control application 440. At least one AR application and/or at least one general application 450 may be controlled by the AR control application 440. For example, the AR control application 440 may perform a function that is identical or similar to the function of at least one of the AR mode processing module 331, the event detection module 332, the event information processing module 333, or the application controller 334 of FIG. 3.

According to an embodiment of the disclosure, when a user device operates in the AR mode or the normal mode, the system operating system 410 may notify the framework 420 that an event occurs (e.g., receiving a text message from a counterpart's electronic device). When an event occurs in the case where the user device operates in the normal mode, the framework 420 may control execution of the general application such that a screen associated with the event is displayed through a display (e.g., the touch screen 320 in FIG. 3) of the user device. When an event occurs in the case where the user device operates in the AR mode, the framework 420 may control the general application such that a screen associated with the event is displayed only through an AR device (e.g., the AR device 302 in FIG. 3) and is not displayed through a display of the user device, thereby preventing unnecessary resource consumption and preventing the general application from interfering with an operation in the AR mode. According to another embodiment of the disclosure, when an event occurs in the case where the user device operates in the AR mode, the framework 420 may provide an environment in which a user is capable of controlling an AR device through the user device, by controlling an event-related screen to be displayed through the display of the user device as well as the AR device.

Figure 5:
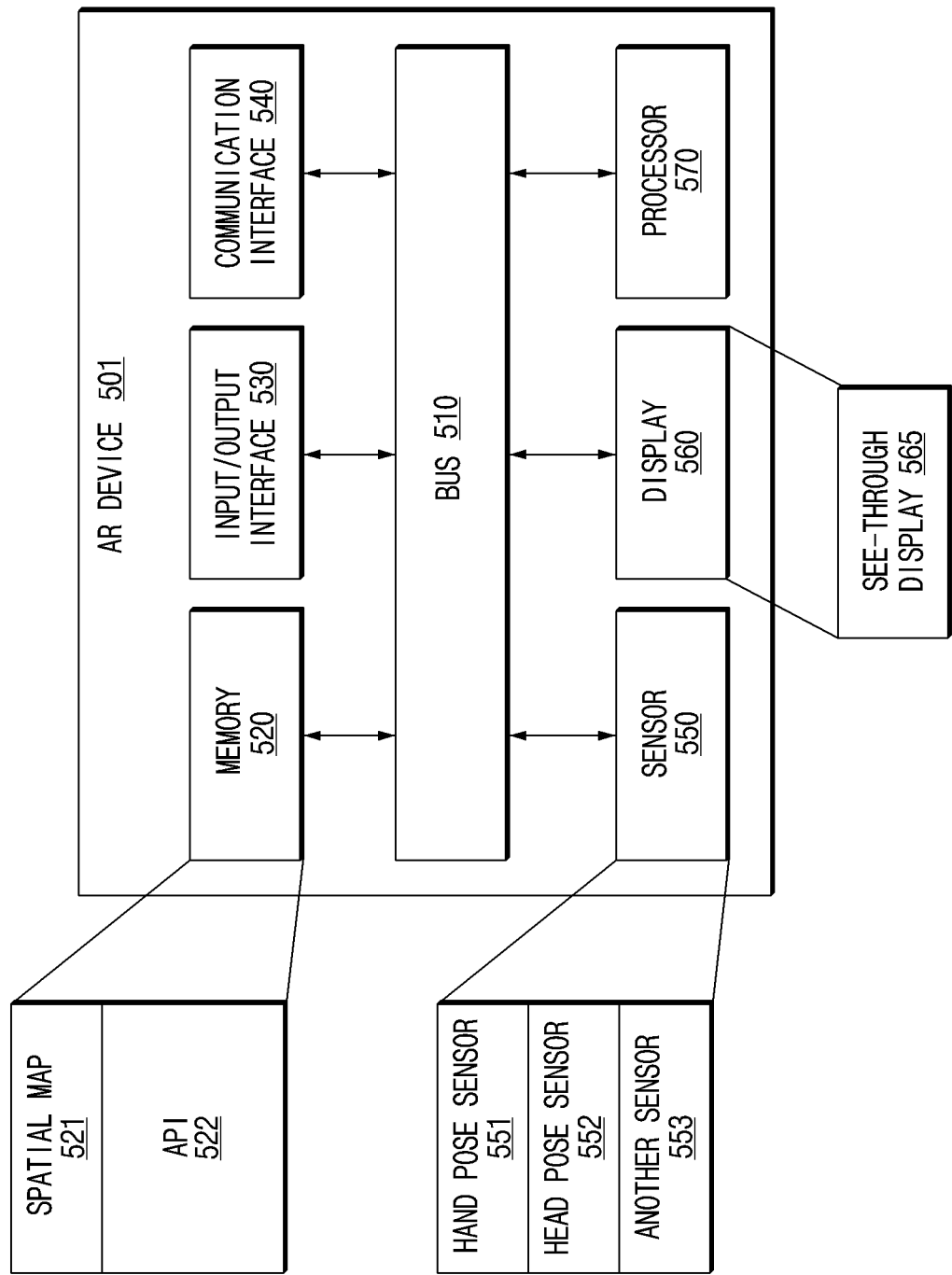
FIG. 5 is a block diagram of an augmented reality (AR) device according to an embodiment of the disclosure.

FIG. 5 is a block diagram of an AR device according to an embodiment of the disclosure.

Referring to FIG. 5, an AR device 501 may include a configuration that is identical or similar to that of the AR device 101 of FIG. 1 or the AR device 302 of FIG. 3, and may perform a function that is identical or similar to that of the AR device 101 of FIG. 1 or the AR device 302 of FIG. 3. The AR device 501 may include a memory 520, an input/output interface 530, a communication interface 540, a sensor 550, a display 560, and a processor 570 that are operatively connected through a bus 510.

The memory 520 may store a spatial map 521. For example, the spatial map 521 may refer to spatial information about a real space (e.g., the real space 10 of FIG. 1) surrounding the AR device 501. For example, when the AR device 501 is worn by a user, the AR device 501 may generate a space surrounding the AR device 501 as a 3D map by scanning a surrounding area through the sensor 550. The AR device 501 may identify a location of the AR device 501 by using the generated spatial map 521 or may identify a location where a specific GUI (e.g., the first GUI 30 of FIG. 1 or the avatars 32, 34, and 36) is positioned.

The memory 520 may include an API 522 for providing a necessary function to applications stored in the AR device 501.

The input/output interface 530 may include a hardware or software configuration for interfacing with a user. For example, the input/output interface 530 may include a microphone or a speaker.

The communication interface 540 may be configured to be connected to a user device (e.g., the user device 301 in FIG. 3) by wire or wirelessly. The communication interface 540 may also be referred to as a "communication module" or a "communication circuit".

The sensor 550 may include at least one sensor. For example, the sensor 550 may include at least one of a hand pose sensor 551 capable of sensing a movement of the user's hand (or a finger), a head pose sensor 552 capable of sensing a movement of the user's head, or another sensor 553. For example, the other sensor 553 may include at least one of a location measurement sensor capable of identifying a location of the AR device 501 in a real space, such as a global positioning system (GPS), a motion sensor capable of sensing a direction or movement of the AR device 501, such as an acceleration sensor, a geomagnetic sensor, and a gyro sensor, a proximity sensor capable of sensing an external object positioned at a location close to the AR device 501, a red green blue (RGB) sensor capable of sensing an intensity of light or color around the AR device 501, an illuminance sensor, or a hall sensor.

The display 560 may include a see-through display 565 to provide an AR to a user.

The processor 570 may be operatively connected to the memory 520, the input/output interface 530, the communication interface 540, the sensor 550, and the display 560, and may perform overall operations of the AR device 501.

Figure 6:
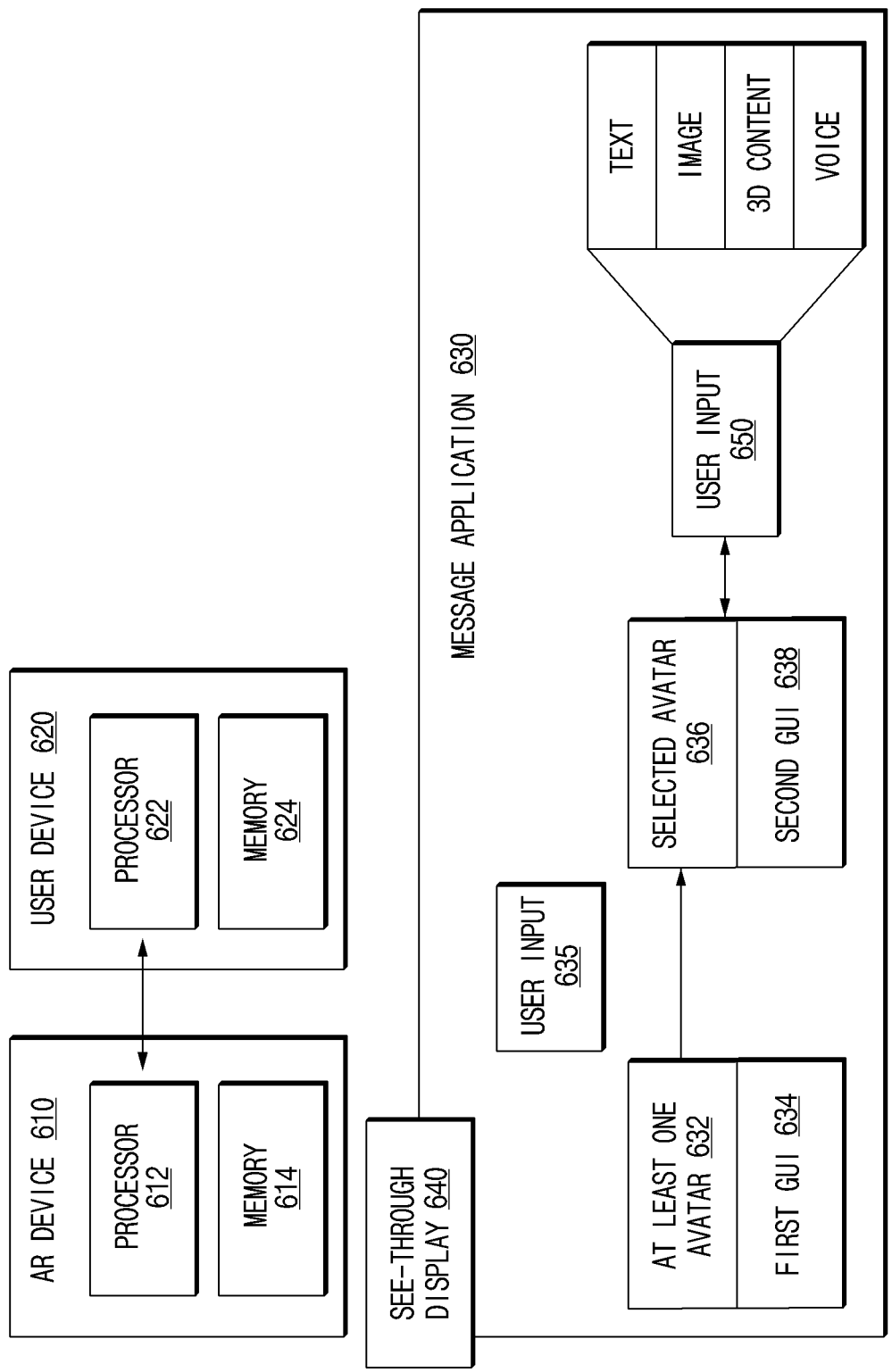
FIG. 6 is a diagram of a message application combined with a hardware configuration of an AR system according to an embodiment of the disclosure.

FIG. 6 is a diagram of a message application 630 combined with a hardware configuration of an AR system according to an embodiment of the disclosure.

Referring to FIG. 6, an AR device 610 and a user device 620 may be electrically connected to each other. For example, the user device 620 may be mounted in the AR device 610, the AR device 610 and the user device 620 may be connected through a wired interface. Alternatively, the AR device 610 and the user device 620 may be connected via wireless communication. A processor 612 and a memory 614 of the AR device 610 may perform functions that are identical or similar to functions of the processor 570 and the memory 520 of FIG. 5, respectively. A processor 622 and a memory 624 of the user device 620 may perform functions that are identical or similar to functions of the controller 330 and the memory 340 of FIG. 3, respectively.

The message application 630 may be stored in the memory 624 of the user device 620. In this case, the message application 630 may perform functions that are identical or similar to those of the modules included in the controller 330 of FIG. 3 or the AR control application 440 of FIG. 4. For example, the message application 630 may render at least one avatar 632 (e.g., the avatar 32, 34, or 36 of FIG. 1) and a first GUI 634 (e.g., the first GUI 30 of FIG. 1) that are to be displayed through a see-through display 640 (e.g., the display 560 of FIG. 5) of the AR device 610, and may transmit the rendered first GUI 634 and the rendered at least one avatar 632 to the AR device 610. When a user input 635 to select one of at least one avatar included in the first GUI 634 is received, the message application 630 may render a second GUI 638 and a selected avatar 636 such that the selected avatar 636 is displayed on the second GUI 638 (e.g., a second GUI 920 in FIG. 9) indicating a message thread. The message application 630 may transmit the rendered second GUI 638 and the selected avatar 636 to the AR device 610. While the second GUI 638 is displayed, the message application 630 may receive a user input 650 to enter content. For example, the content may include at least one of a text, an image, 3D content, or a voice.

The AR device 610 may output the first GUI 634, at least one avatar 632, the selected avatar 636, and the second GUI 638, which are rendered through the message application 630, through the see-through display 640. According to an embodiment of the disclosure, the AR device 610 may obtain the user input 635 to select an avatar and the user input 650 to enter content, through a sensor (e.g., the sensor 550 in FIG. 5).

Figure 7:
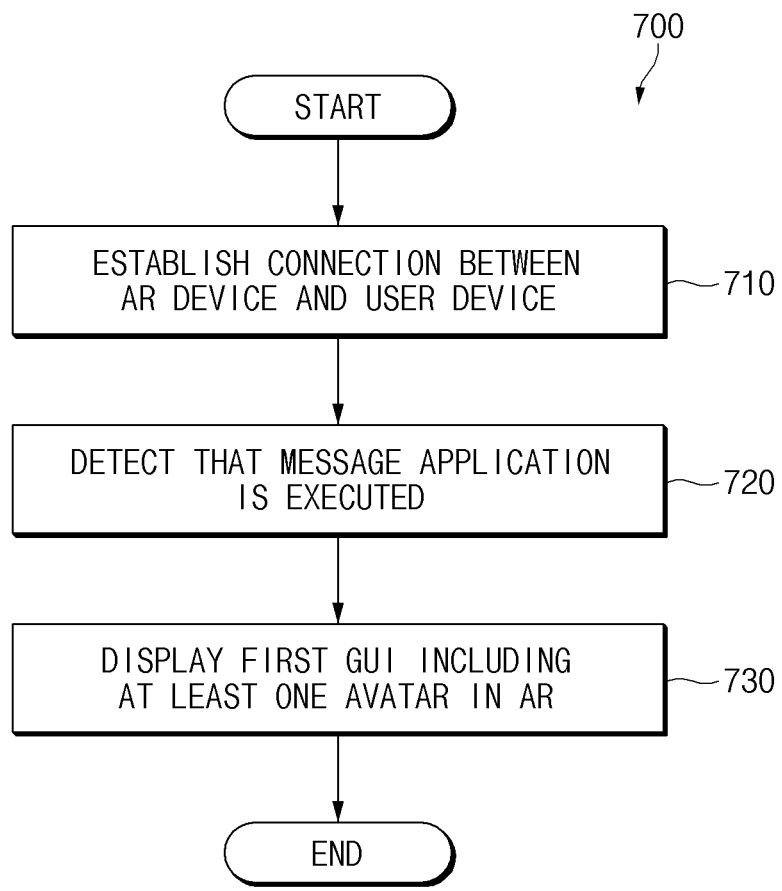
FIG. 7 illustrates an operation flowchart of an AR system for displaying a first GUI and an avatar according to an embodiment of the disclosure.

FIG. 7 illustrates an operation flowchart 700 of an AR system for displaying a first GUI and an avatar according to an embodiment of the disclosure. An AR system may refer to a system including an AR device (e.g., the AR device 610 of FIG. 6) and a user device (e.g., the user device 620 of FIG. 6).

Referring to FIG. 7, in operation 710, the AR system may establish a connection between the AR device and the user device. The connection between the AR device and the user device may be established by wire or wirelessly. For example, when the AR device is implemented with an HMD, the user device may be mounted in the AR device. As another example, the AR device and the user device may be tethered through a wired interface or a wireless communication protocol (e.g., Bluetooth or Wi-Fi).

In operation 720, the AR system may detect that a message application of the user device is executed while the connection between the AR device and the user device is established. For example, the message application may include an application capable of communicating with another user device. For example, the message application may be replaced with a chat application, a video call application, a mail application, or a social network service (SNS) application.

In operation 730, the AR system may display a first GUI (e.g., GUI 30 of FIG. 1) including at least one avatar (e.g., the avatar 32, 34, or 36 of FIG. 1) in an AR. The first GUI may refer to an object in which a space in which at least one avatar is positioned is visually displayed in the AR. The at least one avatar may be based on at least one contact stored in the executed message application or a contact application linked to the message application.

Figure 8A:
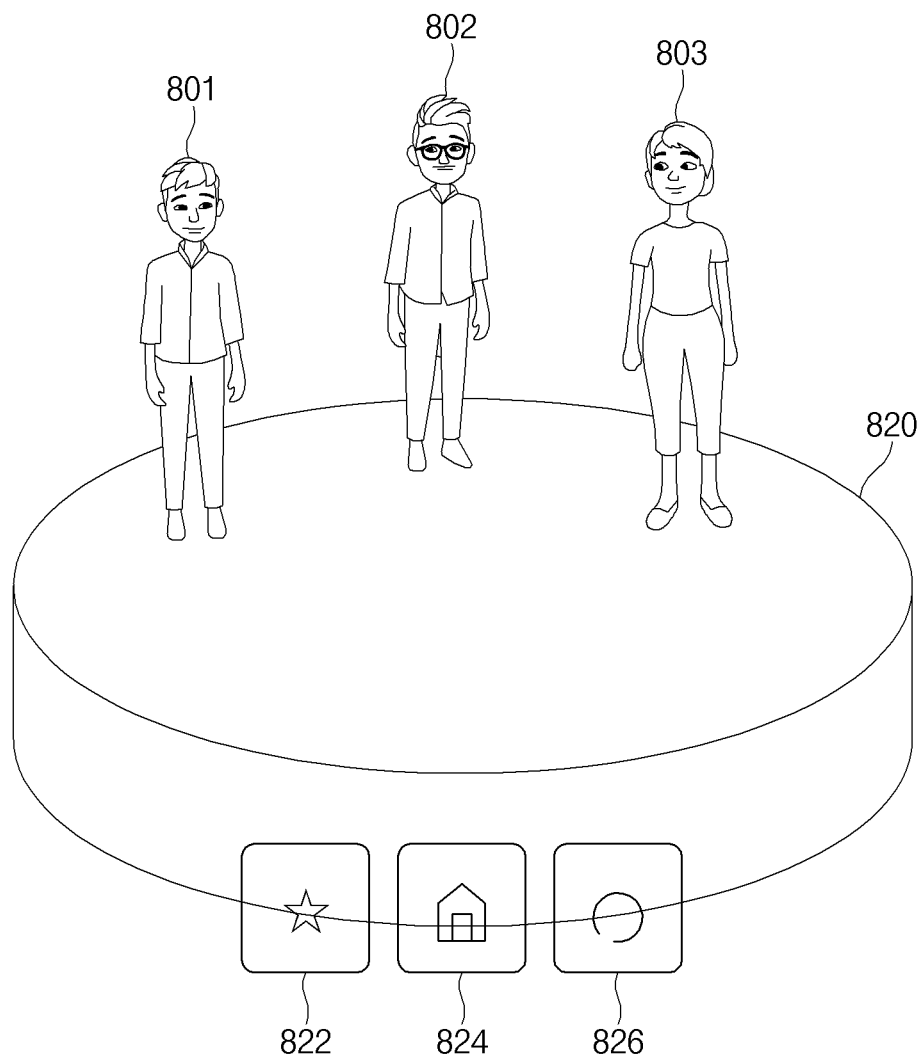
FIG. 8A illustrates a first GUI including an avatar according to an embodiment of the disclosure.

FIG. 8A illustrates a first GUI including an avatar according to an embodiment of the disclosure.

Referring to FIG. 8A, an AR device may display a first GUI 820 in an AR. A shape of the first GUI 820 is not limited to an example shown in FIG. 8A, and, a shape of the first GUI 820 may be changed by user settings. The first GUI 820 may be fixed to a specified location in a real space or may be fixed to a specified area of a display of an AR device. According to an embodiment of the disclosure, the AR device may display at least one avatar 801, 802, or 803 at a location (e.g., a top surface of the first GUI) adjacent to the first GUI 820. The AR device may display the specified number of avatars on the first GUI 820 based on a size of the first GUI 820. For example, the AR device may display, on the first GUI 820, a contact, which is specified as a favorite depending on user settings, or a contact having a high frequency of contact.

According to an embodiment of the disclosure, the AR device may display icons 822, 824, and 826 of a menu for controlling the first GUI 820 or the at least one avatar 801, 802, or 803 at a location adjacent to the first GUI 820. For example, the menu corresponding to the icons 822, 824, and 826 may include at least one of editing of the first GUI 820, favorite settings, editing of an avatar, checking of recent communication, or editing of a contact.

Figure 8B:
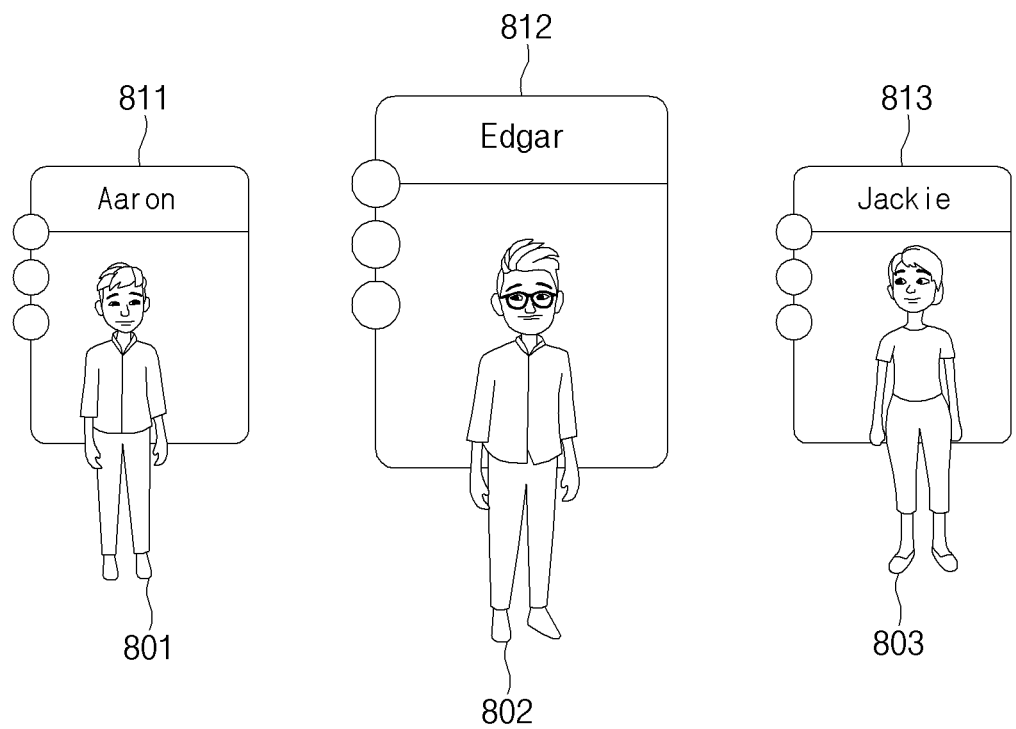
FIG. 8B illustrates an avatar corresponding to a contact according to an embodiment of the disclosure.

FIG. 8B illustrates an avatar corresponding to a contact according to an embodiment of the disclosure.

Referring to FIG. 8B, an AR device may edit at least one avatar 801, 802, or 803 or contact information 811, 812, or 813 respectively corresponding to the at least one avatar 801, 802, or 803. For example, when an avatar of a contact stored in a user device has not been generated yet, the AR device may apply one of the pre-stored template avatars to a contact by a user's selection. When a counterpart of a contact, to which a template avatar is applied, generates a new avatar, an avatar stored in the user device may be changed from the template avatar to an avatar generated by the counterpart.

Figure 9:
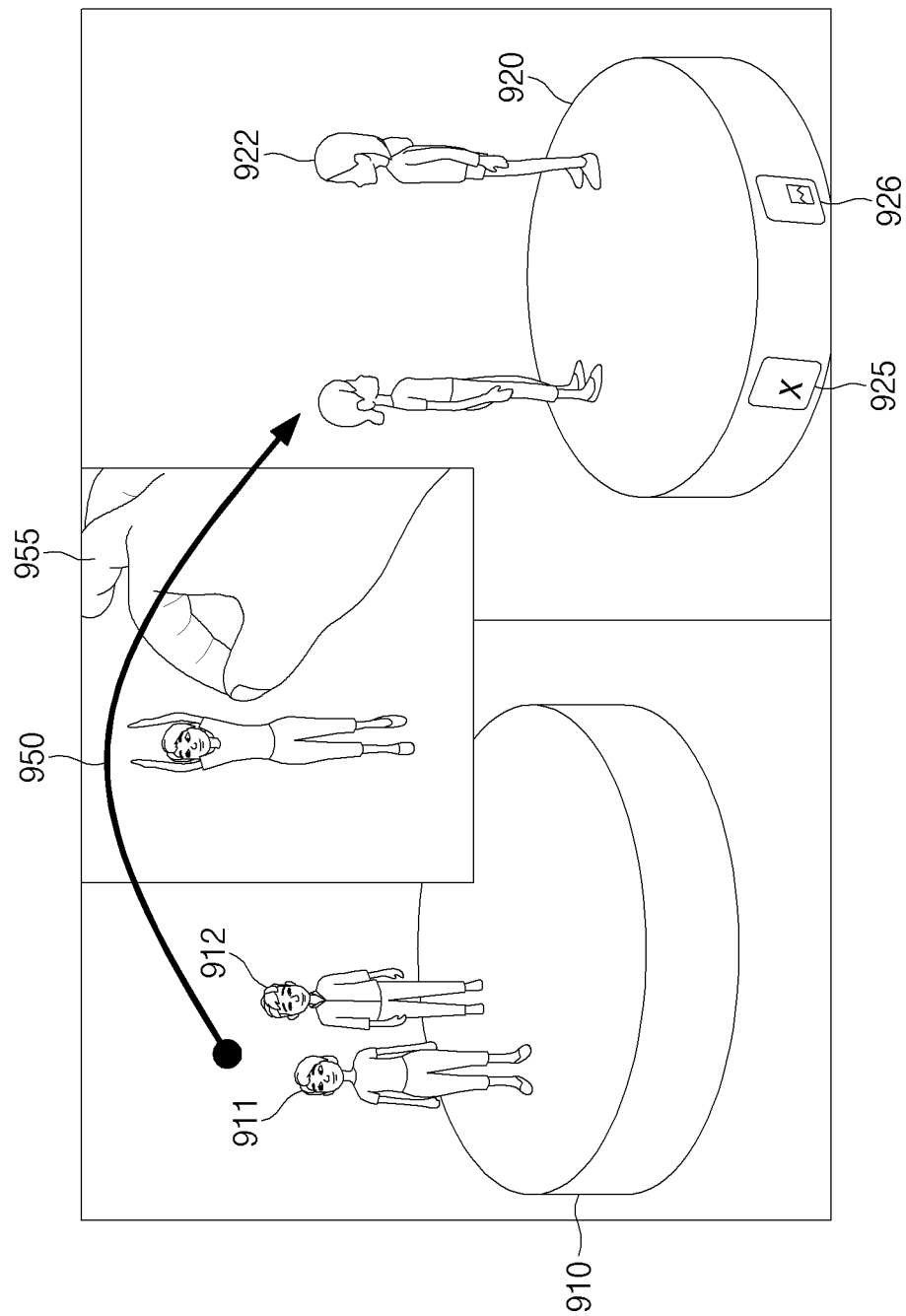
FIG. 9 illustrates a graphic effect of moving an avatar from a first GUI to a second GUI in an AR according to an embodiment of the disclosure.

FIG. 9 illustrates a graphic effect of moving an avatar from a first GUI to a second GUI in an AR according to an embodiment of the disclosure.

Referring to FIG. 9, an AR device (e.g., the AR device 610 of FIG. 6) may display a second GUI 920 in an AR in addition to a first GUI 910. The first GUI 910 may correspond to the first GUI 30 of FIG. 1 or the first GUI 820 of FIG. 8A. The second GUI 920 may indicate a message thread of a message application. The second GUI 920 may be referred to as a 'nest'. In this case, the first GUI 910 and the second GUI 920 may be referred to as a 'main nest' and a 'secondary nest', respectively.

According to an embodiment of the disclosure, the second GUI 920 may include a first avatar 922 corresponding to a user account of an AR system. It may be described that the second GUI 920 'includes' the first avatar 922. However, according to various embodiments of the disclosure, the AR device may place the first avatar 922 at a location (e.g., top, bottom, side, or inside) adjacent to the second GUI 920.

According to an embodiment of the disclosure, the AR device may detect a user gesture 955 of moving 950 a second avatar 911 to the second GUI 920 among avatars 911 and 912 included in the first GUI 910. For example, the AR device may detect a user gesture 955 of grabbing 950 the second avatar 911 from the first GUI 910 through a hand pose sensor (e.g., the hand pose sensor 551 in FIG. 5), and dropping the grabbed second avatar 911 on the second GUI 920. The AR device may provide a graphic effect of moving the second avatar 911 from the first GUI 910 to the second GUI 920 depending on the detected user gesture 955 in the AR. When the second avatar 911 is located on the second GUI 920, a user device electrically connected to the AR device may communicate with a counterpart of a contact corresponding to the second avatar 911.

According to an embodiment of the disclosure, the second GUI 920 may be displayed before the second avatar 911 is selected, the second avatar 911 may be displayed in response to detecting a user gesture 955 that deviates from the first GUI 910.

According to an embodiment of the disclosure, to provide a sense of reality, such as a talking between the first avatar 922 and the second avatar 911, an AR device may change locations and directions of the first avatar 922 and the second avatar 911. For example, the AR device may be arranged such that the first avatar 922 and the second avatar 911 stand while facing each other on opposite sides of the second GUI 920.

According to an embodiment of the disclosure, the AR device may display icons 925 and 926 of menus for controlling a message thread indicated by the second GUI 920 at a location adjacent to the second GUI 920. For example, the menu corresponding to the icons 925 and 926 may include at least one of a function to terminate the message thread, a function to share content (e.g., at least one of an image, a video, a link, a map, another person's contact, a music, a file, a voice message, or a schedule), or a function to send an emoticon.

According to an embodiment of the disclosure, the AR device may terminate communication with a counterpart of a contact indicated by the second avatar 911, in response to detecting a user gesture 955 of moving 950 the second avatar 911 from the second GUI 920 to the first GUI 910.

Figure 10A:
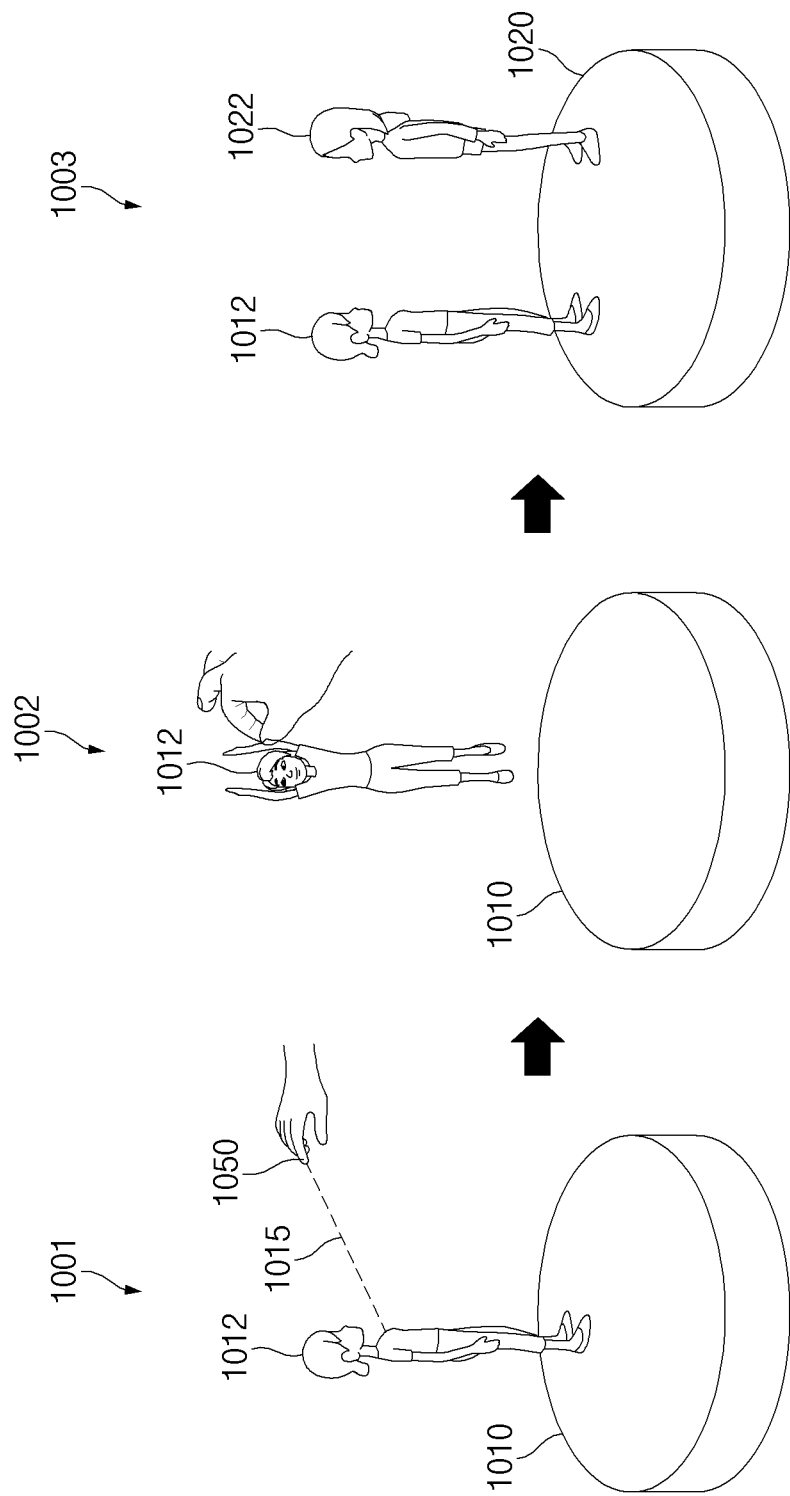
FIG. 10A illustrates an operation of detecting a gesture for an avatar according to an embodiment of the disclosure.
Figure 10B:
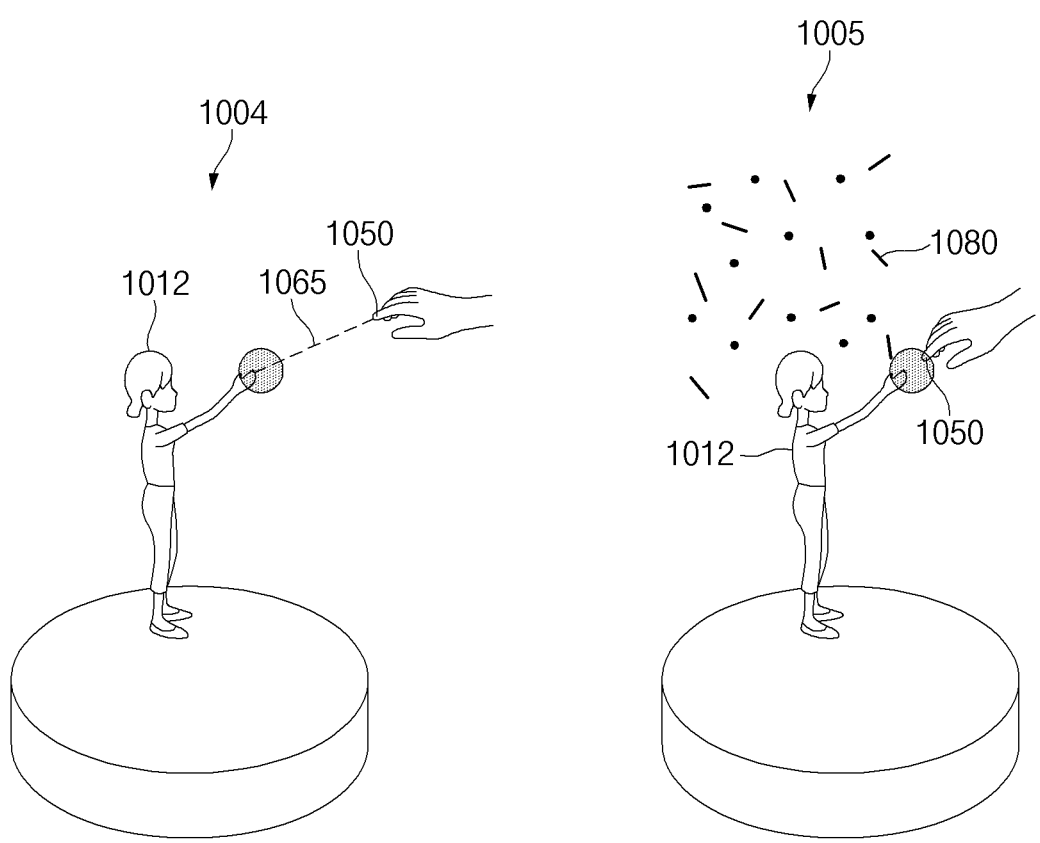
FIG. 10B illustrates a graphic effect indicating a response of an avatar to a gesture according to an embodiment of the disclosure.

FIGS. 10A and 10B illustrate an operation of detecting a gesture for an avatar according to various embodiments of the disclosure. FIGS. 10A and 10B illustrate an operation of detecting a movement of a user's finger (or a hand) by using a hand pose sensor.

Referring to FIGS. 10A and 10B, in operation 1001, an AR device may detect that a user's finger 1050 moves toward an avatar 1012 disposed on a first GUI 1010 (e.g., the first GUI 910 in FIG. 9). The AR device may not only detect the movement of the user's finger 1050, but may also measure a distance 1015 between the user's finger 1050 and the avatar 1012.

When the distance 1015 between the user's finger 1050 and the avatar 1012 is less than a threshold value, the AR device may determine that the avatar 1012 is selected by the user. According to an embodiment of the disclosure, to notify the user that the distance 1015 between the user's finger 1050 and the avatar 1012 is getting closer, the AR device may provide a graphic effect indicating a gesture of the avatar 1012. For example, referring to operation 1004 of FIG. 10B, the AR device may provide a graphic effect in which the avatar 1012 raises a hand in a direction, in which the user's finger 1050 is located, in response to detecting that the distance 1065 between the user's finger 1050 and the avatar 1012 is less than the threshold value. According to an embodiment of the disclosure, to guide a location where the user's finger 1050 is capable of grabbing the avatar 1012, the AR device may output an additional graphic effect (e.g., light) on a hand raised by the avatar 1012. For another example, referring to FIG. 10B, in operation 1005, the AR device may provide a visual graphic effect 1080 (e.g., firecrackers or pollen) at a periphery of the avatar 1012 in response to an event that the user's finger 1050 touches a hand of the avatar 1012.

In operation 1002, the AR device may detect a gesture in which the user's finger 1050 grabs the avatar 1012. For example, when the user's finger 1050 touches the avatar 1012 or the distance between the user's finger 1050 and the avatar 1012 is less than the threshold value, the AR device may detect a movement in which the user's finger 1050 is closed. The AR device may provide a graphic effect in which the avatar 1012 deviates from the first GUI 1010, in response to detecting a gesture in which the user's finger 1050 grabs the avatar 1012. The AR device may provide a graphic effect in which the avatar 1012 moves together with the user's finger 1050 depending on the movement of the closed user's finger 1050.

In operation 1003, the AR device may display the avatar 1012 on a second GUI 1020 in response to detecting that the user's finger 1050 is opened or detecting that the avatar 1012 is located at a location adjacent to the second GUI 1020 (e.g., the second GUI 920 in FIG. 9). The second GUI 1020 may include an avatar 1022 (e.g., the first avatar 922 of FIG. 9) corresponding to a user account of the AR device.

FIG. 10A illustrates an embodiment in which the avatar 1012 moves from the first GUI 1010 to the second GUI 1020. However, the same principle may be applied to an embodiment in which the avatar 1012 moves from the second GUI 1020 to the first GUI 1010.

Figure 11:
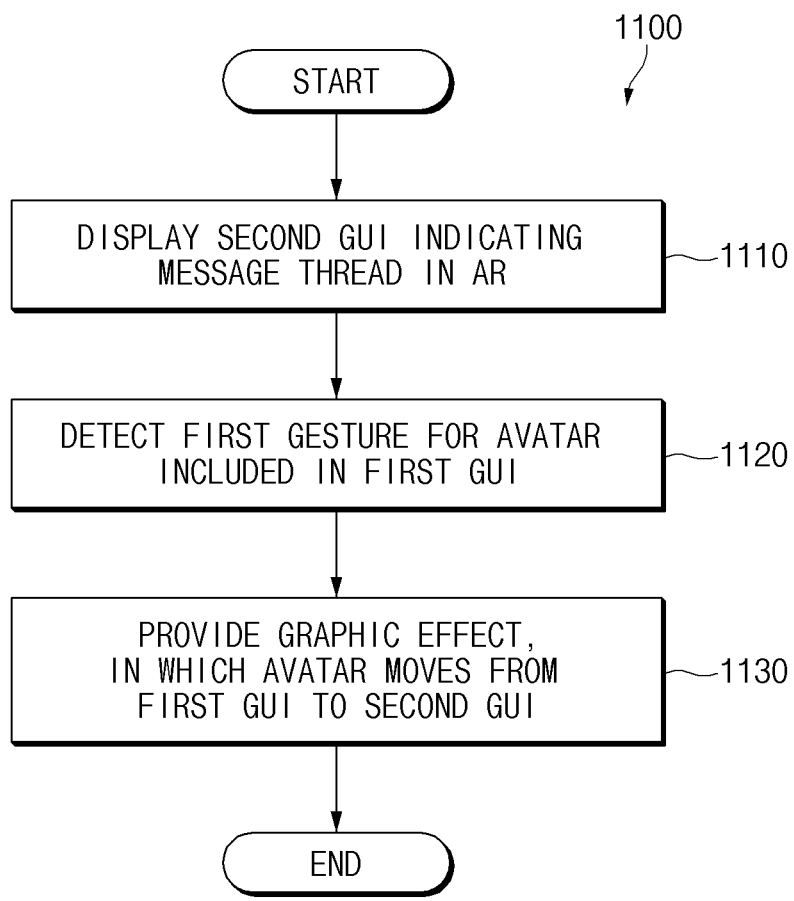
FIG. 11 is an operation flowchart of an AR system for providing a graphic effect in which an avatar moves according to an embodiment of the disclosure.

FIG. 11 is an operation flowchart 1100 of an AR system for providing a graphic effect in which an avatar moves according to an embodiment of the disclosure.

Referring to FIG. 11, in operation 1110, an AR system may display a second GUI (e.g., the second GUI 920 of FIG. 9) indicating a message thread in an AR. According to an embodiment of the disclosure, the second GUI may include an avatar (e.g., the first avatar 922 of FIG. 9) corresponding to a user account of the AR system.

In operation 1120, the AR system may detect a first gesture for an avatar (e.g., the second avatar 911 of FIG. 9) included in the first GUI (e.g., the first GUI 910 of FIG. 9). For example, the AR system may detect a movement, in which a user's finger moves to a location close to an avatar and the user's finger is closed toward the avatar, using a hand pose sensor. The AR system may detect a movement in which the user's finger moves from the first GUI to the second GUI while the user's finger is closed.

In operation 1130, the AR system may provide a graphic effect, in which the avatar moves from the first GUI to the second GUI, based on the detected first gesture.

According to another embodiment of the disclosure, the AR system may display the second GUI in the AR in response to detecting the first gesture in operation 1120. For example, when it is detected that the user's finger grabs the avatar, the AR system may display the second GUI.

Figure 12:
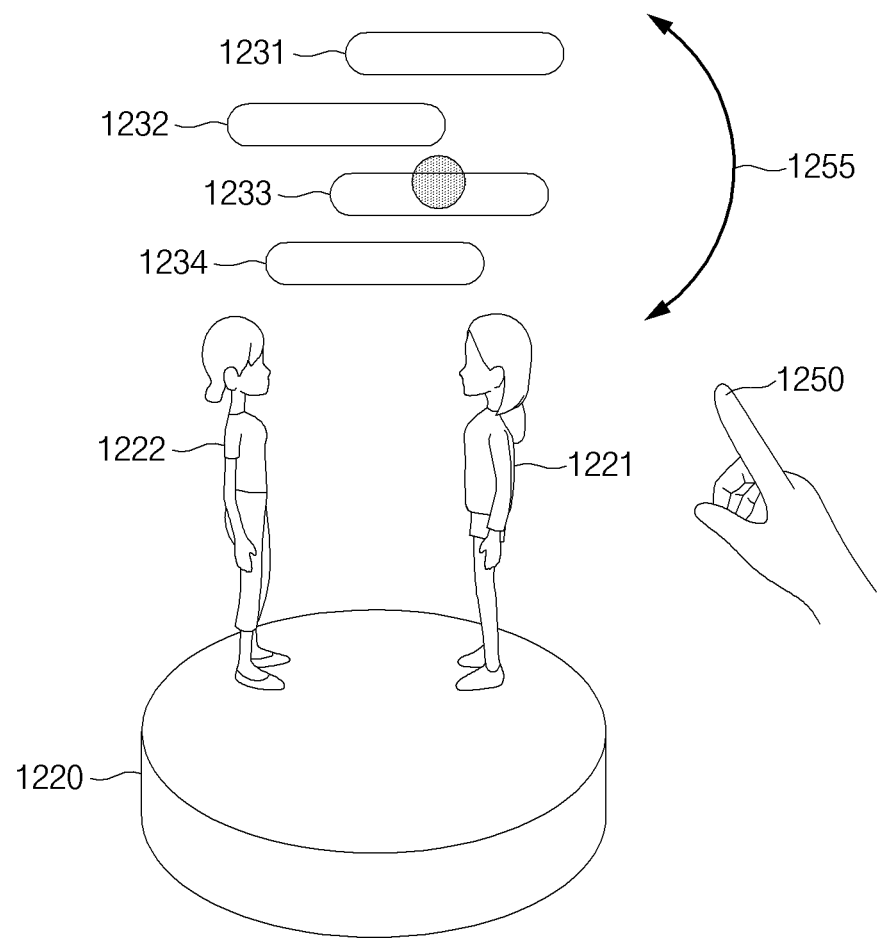
FIG. 12 illustrates an operation of changing a message thread according to an embodiment of the disclosure.

FIG. 12 illustrates an operation of changing a message thread according to an embodiment of the disclosure.

Referring to FIG. 12, a user device may generate a plurality of message threads for counterparts of a plurality of contacts. An AR device may display a plurality of GUIs 1231, 1232, 1233, and 1234 indicating the plurality of message threads in an AR. For example, the AR device may display the plurality of GUIs 1231, 1232, 1233, and 1234 indicating the plurality of message threads at a location adjacent to a second GUI 1220 (e.g., the second GUI 920 of FIG. 9) generated between a first avatar 1221 and a second avatar 1222.

According to an embodiment of the disclosure, the AR device may select a current message thread among the plurality of message threads depending on a user input. For example, the AR device may select the current message thread among the plurality of message threads depending on a movement in which a user finger 1250 scrolls the plurality of GUIs 1231, 1232, 1233, and 1234 in a specified direction (e.g., 1255) or touches one of the plurality of GUIs 1231, 1232, 1233, and 1234.

Figure 13A:
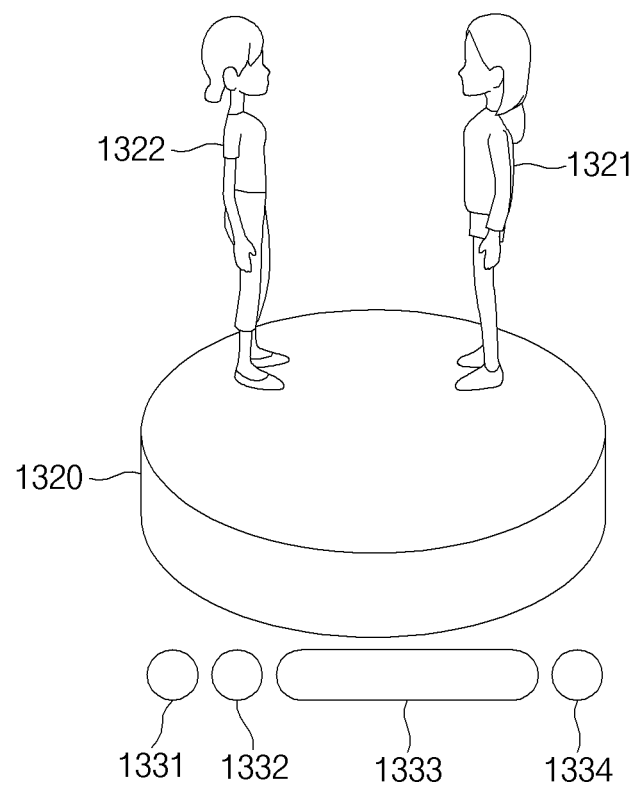
FIG. 13A illustrates a user interface (UI) for entering a message according to an embodiment of the disclosure.
Figure 13B:
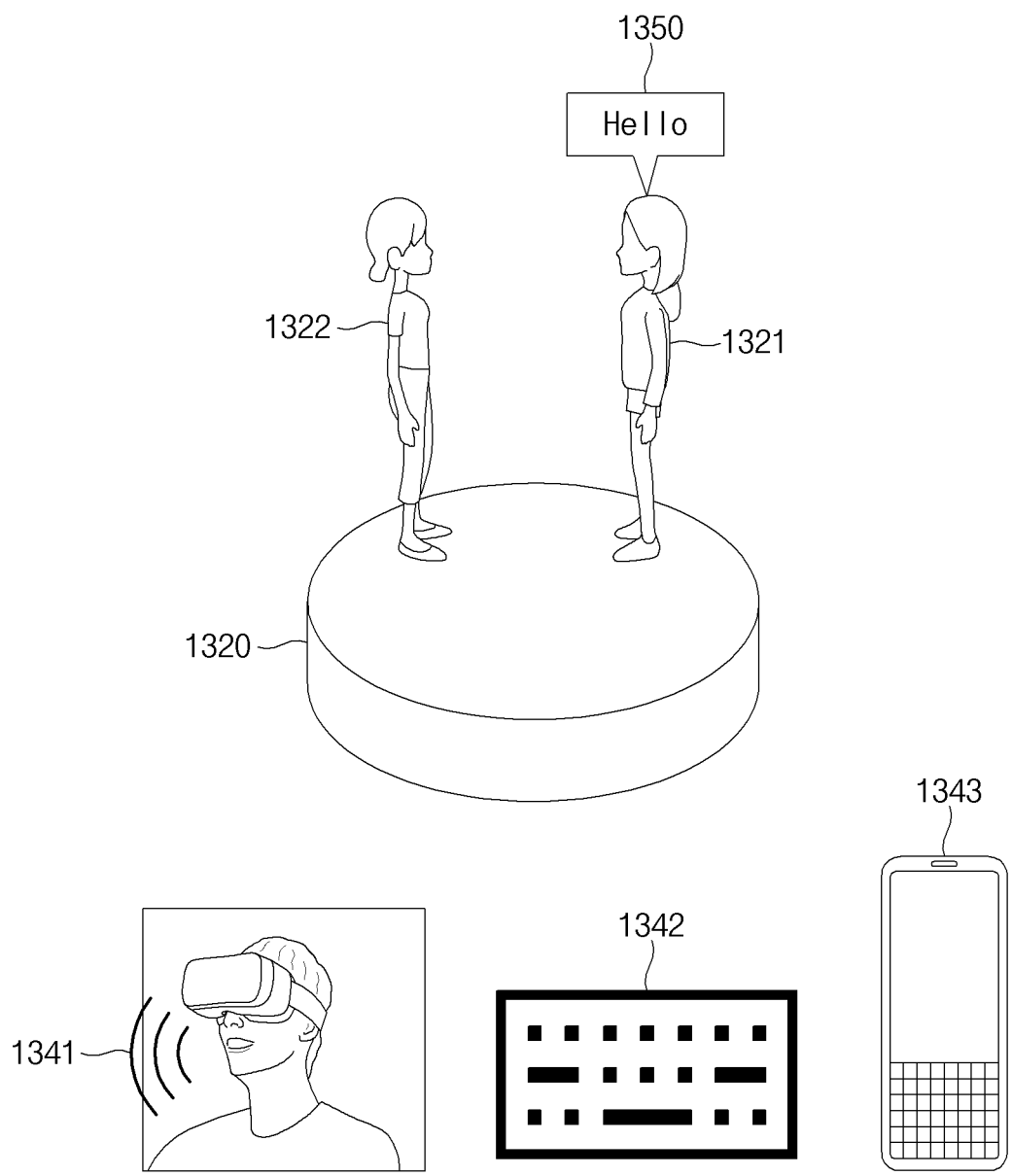
FIG. 13B illustrates a UI for entering a message according to an embodiment of the disclosure.

FIGS. 13A and 13B illustrate a user interface for entering a message according to various embodiments of the disclosure.

Referring to FIG. 13A, an AR device may display a second GUI 1320 (e.g., the second GUI 920 of FIG. 9) including a first avatar 1321 (e.g., the first avatar 922 in FIG. 9) and a second avatar 1322 (e.g., the second avatar 911 in FIG. 9). The AR device may display, at a location adjacent to the second GUI 1320, icons 1331, 1332, and 1333 for selecting the type of a user input to be transmitted to a counterpart of a contact corresponding to the second avatar 1322 and an icon 1334 for transmitting a obtained user input to the counterpart of the contact corresponding to the second avatar 1322. For example, the type of an input indicated by the icons 1331, 1332, and 1333 may include a voice input, a text input, or a reaction input. For example, the reaction input may refer to a gesture that appears on the first avatar 1321.

Referring to FIG. 13B, for example, the AR device may receive a user's voice input 1341. The AR device may obtain the voice input 1341 through a microphone (e.g., the input/output interface 530 of FIG. 5) of the AR device. As another example, a user device connected to the AR device may obtain the voice input 1341 through a microphone (e.g., the input module 250 in FIG. 2) of the user device, and may transmit the obtained voice input 1341 to the AR device. As another example, the AR device may obtain a text input through a virtual keyboard 1342 displayed in an AR. In this case, the AR device may obtain a text input on the virtual keyboard 1342 by detecting a movement of a user's finger using a hand pose sensor. As another example, the AR device may obtain a text input through a virtual keyboard output on a touch screen of a user device 1343. As another example, although not shown in FIG. 13B, the AR device may obtain a text input through an input device (e.g., a Bluetooth keyboard) separately connected to the user device 1343.

According to an embodiment of the disclosure, the AR device may obtain a message input through a plurality of input means. For example, when an application of a user device is operated in an AR mode, the AR device may obtain a message input through the virtual keyboard 1342 displayed in the AR and, at the same time, may obtain a message input through the keyboard output on a touch screen of the user device 1343. According to another embodiment of the disclosure, the AR device may set a specific input means as a default means for obtaining a message input. According to another embodiment of the disclosure, the AR device may obtain a message input through an input means that is last used.

According to an embodiment of the disclosure, the AR device may transmit the obtained message (e.g., a voice or a text) indicated by a user input to a counterpart of a contact corresponding to the second avatar 1322.

According to an embodiment of the disclosure, the AR device may provide a sense of reality as if a user of the first avatar 1321 speaks directly to a user of the second avatar 1322, by displaying a text corresponding to the transmitted message or a speech bubble 1350 including a text on the first avatar 1321.

Figure 14:
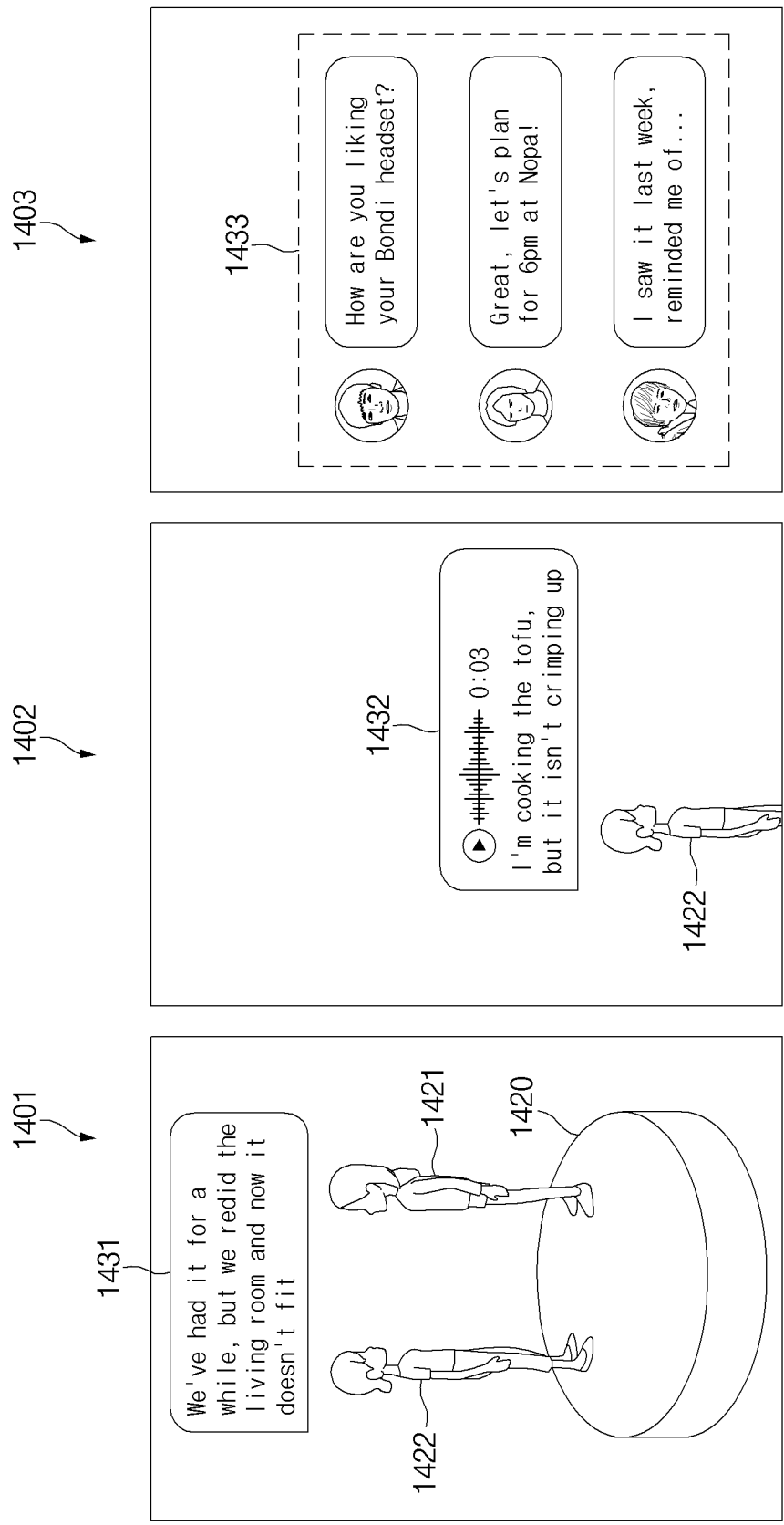
FIG. 14 illustrates a UI for displaying a message according to an embodiment of the disclosure.

FIG. 14 illustrates a UI for displaying a message according to an embodiment of the disclosure.

Referring to FIG. 14, an AR device may display a second GUI 1420 (e.g., the second GUI 920 of FIG. 9) including a first avatar 1421 (e.g., the first avatar 922 in FIG. 9) and a second avatar 1422 (e.g., the second avatar 911 in FIG. 9). The AR device may display a message received from an electronic device of a counterpart or a message transmitted to the electronic device of the counterpart in an AR in various shapes.

For example, in operation 1401, the AR device may display a speech bubble 1431 including a text corresponding to a message in the AR. For example, the speech bubble 1431 may be displayed on an avatar (e.g., the first avatar 1421) corresponding to a subject (e.g., a user of the AR device) that sends a message. According to an embodiment of the disclosure, the AR device may control the speech bubble 1431 to disappear after a specified time.

For another example, in operation 1402, the AR device may display a UI 1432 indicating a voice message in the AR. When a user input for selecting the UI 1432 is received, the AR device may output a voice through a speaker (e.g., the input/output interface 530 of FIG. 5).

According to an embodiment of the disclosure, the AR device may output a message as a voice or a text depending on user settings. For example, even though the AR device obtains a voice message or a voice input, the AR device may display a text corresponding to a voice in the AR through a speech-to-text (STT) technology. On the other hand, even though the AR device obtains a text message or a text input, the AR device may output a voice corresponding to a text in the AR through a text-to-speech (TTS) technology.

For another example, in operation 1403, the AR device may display a UI 1433 indicating message transmission records in the AR. According to an embodiment of the disclosure, the UI 1433 may be scrolled in a specified direction (e.g., upward or downward) based on a user gesture. According to an embodiment of the disclosure, when a specified time elapses or the number of texts included in the UI 1433 is not less than a specified number, the AR device may reduce visual clutter by making at least part of texts included in the UI 1433 disappear from the AR.

Figure 15A:
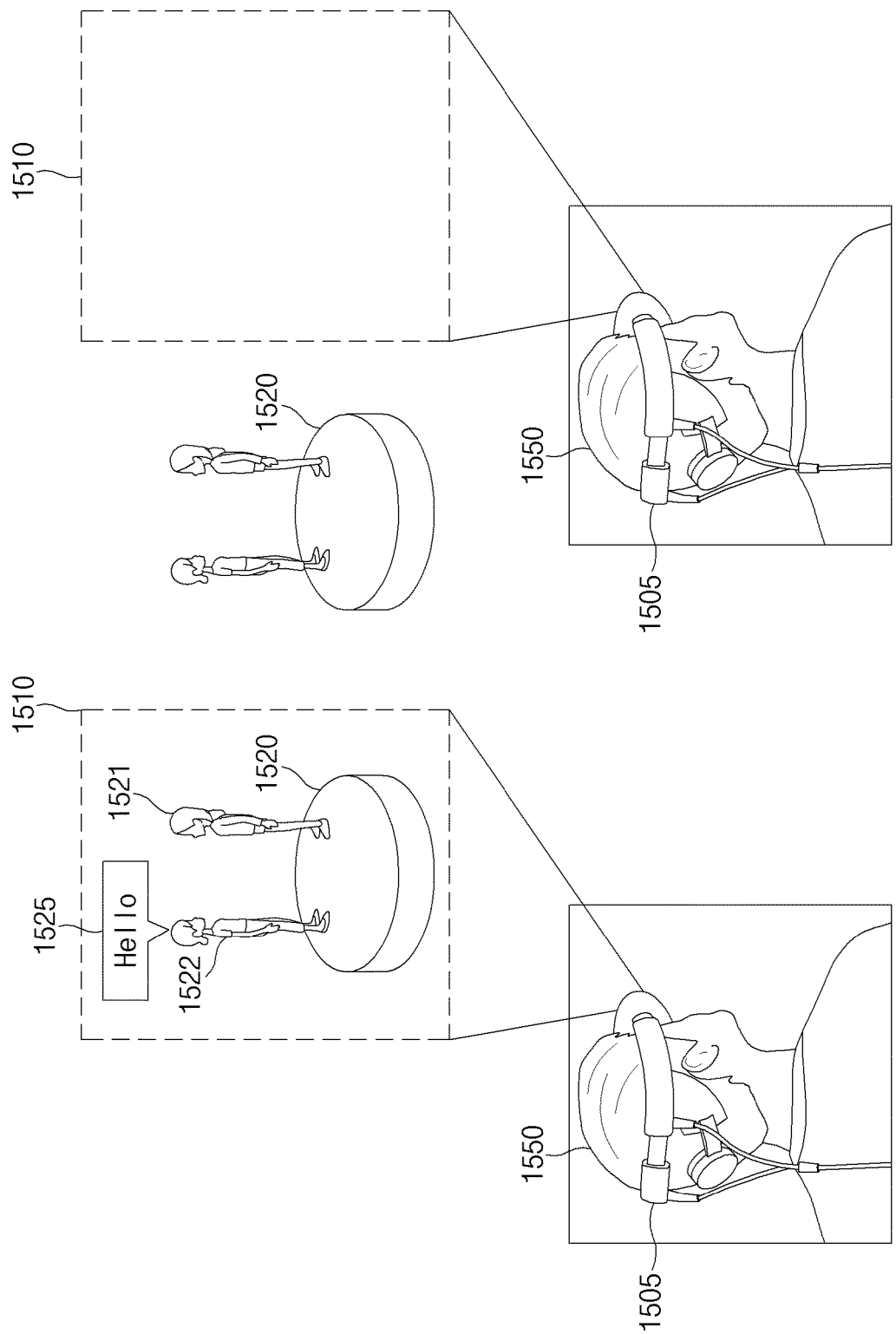
FIG. 15A illustrates an operation of outputting a message depending on a viewing area according to an embodiment of the disclosure.

FIG. 15A illustrates an operation of outputting a message depending on a viewing area according to various embodiments of the disclosure.

Referring to FIG. 15A, when an AR device 1505 (e.g., the AR device 610 in FIG. 6) is worn on a part (e.g., a head) of the body of a user 1550, an AR space that the user 1550 is capable of viewing may be limited due to a physical size limitation of a display (e.g., the display 560 of FIG. 5) of the AR device 1505. In this specification, an area that the user 1550 is capable of viewing through the AR device 1505 may be referred to as a 'viewing area (e.g., the viewing area 1510)'. For example, when a second GUI 1520 (e.g., the second GUI 920 in FIG. 9) including a first avatar 1521 (e.g., the first avatar 922 in FIG. 9) and a second avatar 1522 (e.g., the second avatar 911 in FIG. 9) is fixed to a specified location in a real space, the second GUI 920 may be positioned within the viewing area 1510 or may deviate from the viewing area 1510, depending on a movement of the AR device 1505.

According to an embodiment of the disclosure, the AR device 1505 may output a message as a text or a voice based on whether the second GUI 1520 deviates from the viewing area 1510. For example, when the second GUI 1520 is located within the viewing area 1510 as shown in the left diagram of FIG. 15A, the AR device 1505 may output a message in a text form (e.g., 1525). As another example, when the second GUI 1520 deviates from the viewing area 151 as shown in the right diagram of FIG. 15A, the AR device 1505 may output a message as a voice.

Figure 15B:
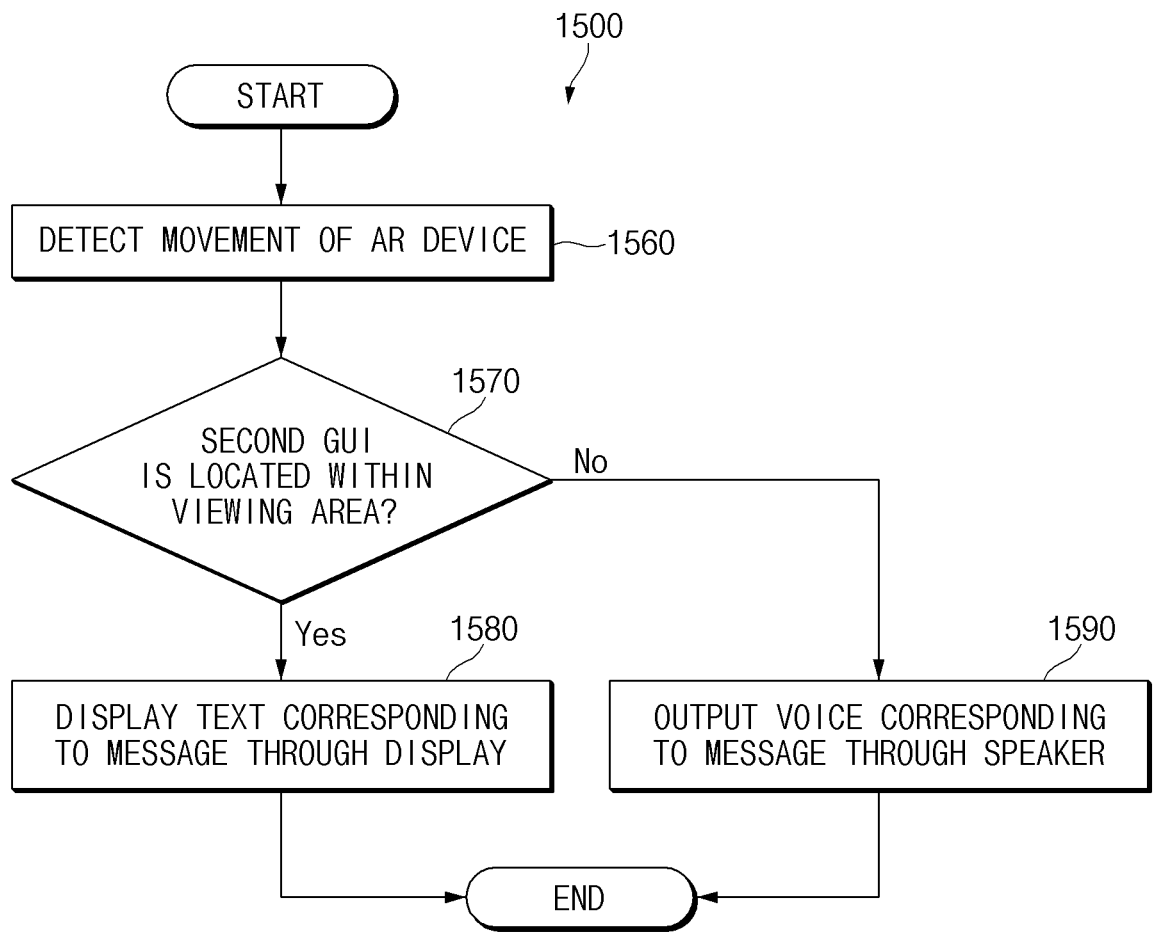
FIG. 15B illustrates an operation flowchart of an AR device for outputting a message depending on a viewing area according to an embodiment of the disclosure.

FIG. 15B illustrates an operation flowchart 1500 of an AR device for outputting a message depending on a viewing area according to an embodiment of the disclosure.

Referring to FIG. 15B, in operation 1560, the AR device 1505 may detect a movement of the AR device 1505. For example, the AR device 1505 may detect the movement of the AR device 1505 through a head pose sensor (e.g., the head pose sensor 552 in FIG. 5) or a motion sensor.

In operation 1570, the AR device 1505 may determine whether the second GUI 1520 is located within the viewing area 1510, in response to an event that the movement is detected.

When the second GUI 1520 is located within the viewing area 1510, in operation 1580, the AR device 1505 may display a text (e.g., 1525) corresponding to a message through the display.

When the second GUI 1520 is not located within the viewing area 1510, in operation 1590, the AR device 1505 may output a voice corresponding to a message through a speaker.

Figure 16:
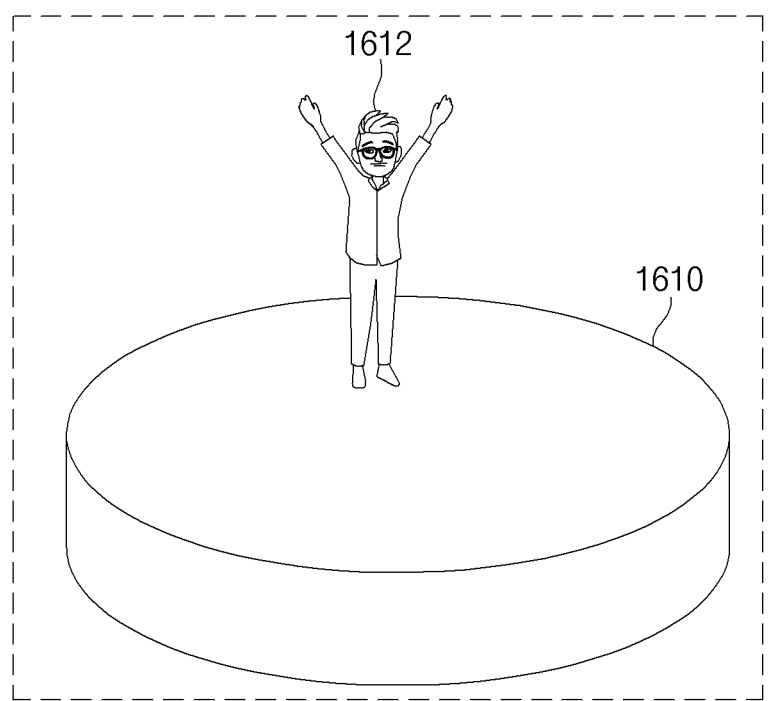
FIG. 16 illustrates a UI for displaying a received message according to an embodiment of the disclosure.

FIG. 16 illustrates a UI for displaying a received message according to an embodiment of the disclosure.

Referring to FIG. 16, after a message thread is generated, a user device (e.g., the user device 620 in FIG. 6) may receive a message from a counterpart of another contact (e.g., a contact corresponding to a third avatar 1612) for which the message thread is not generated. To notify a user of a message received from the counterpart for which the message thread is not generated, an AR device (e.g., the AR device 610 of FIG. 6) may provide a graphic effect indicating a gesture of the third avatar 1612 included in a first GUI 1610 (e.g., the first GUI 910 of FIG. 9). For example, the AR device may provide a graphic effect indicating a gesture in which the third avatar 1612 raises a hand.

Figure 17:
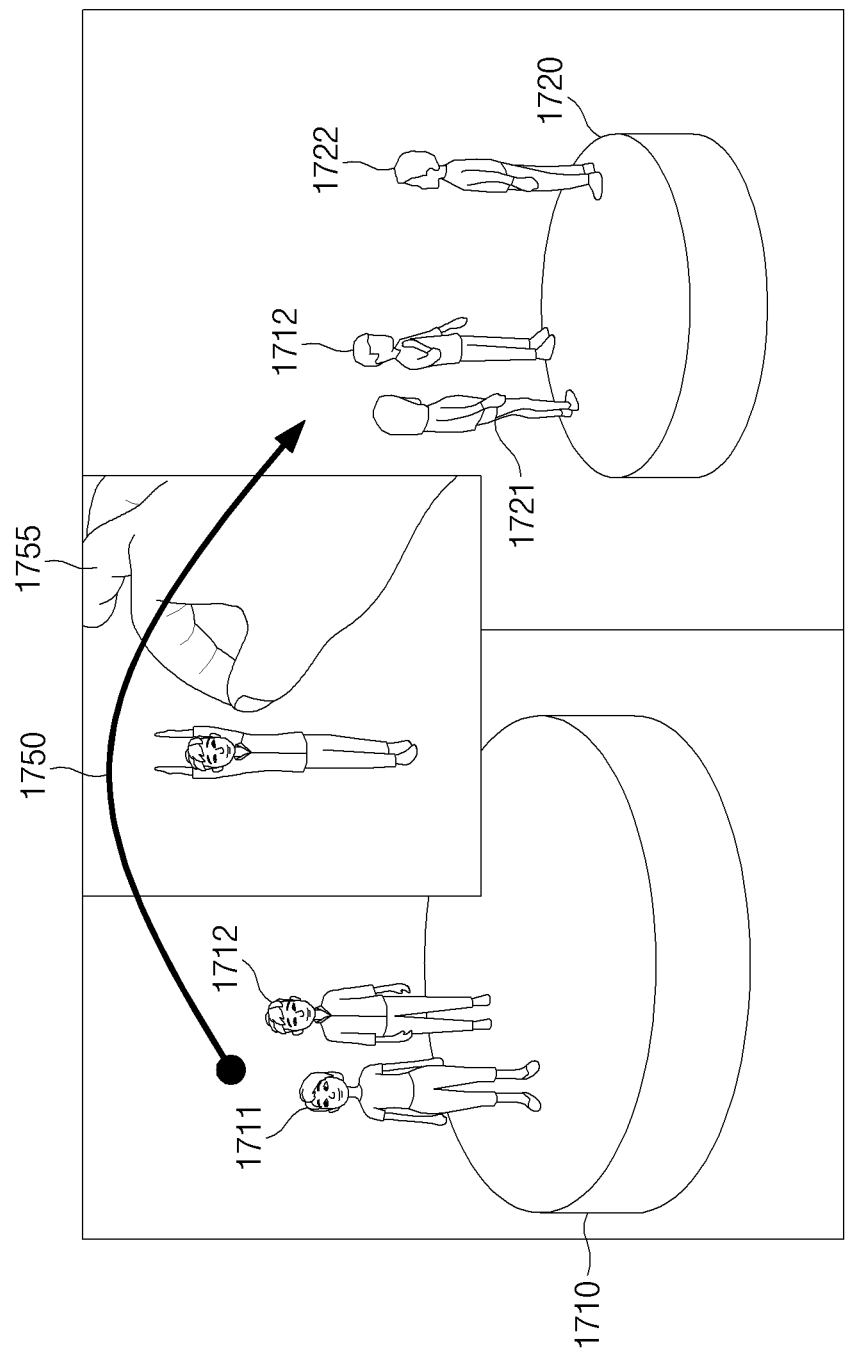
FIG. 17 illustrates a second GUI including a plurality of avatars in an AR according to an embodiment of the disclosure.

FIG. 17 illustrates a second GUI including a plurality of avatars in an AR according to an embodiment of the disclosure.

Referring to FIG. 17, while a second GUI 1720 (e.g., the second GUI 920 of FIG. 9) including a first avatar 1722 (e.g., the first avatar 922 in FIG. 9) and a second avatar 1721 (e.g., the second avatar 911 in FIG. 9) is displayed, an AR device (e.g., the AR device 610 of FIG. 6) may detect a user gesture of moving a third avatar 1712 among avatars 1711 and 1712 included in a first GUI 1710 (e.g., the first GUI 910 of FIG. 9) to the second GUI 1720. The user gesture of moving the third avatar 1712 to the second GUI 1720 may be the same as or similar to the user gesture described with reference to FIG. 9. For example, the AR device may detect, through a hand pose sensor (e.g., the hand pose sensor 551 of FIG. 5), a movement in which a user's finger 1755 moves the third avatar 1712 in a specified direction 1750 while grabbing the third avatar 1712 and then drops the third avatar 1712 on the second GUI 1720.

According to an embodiment of the disclosure, a user device connected to the AR device may simultaneously communicate with a counterpart of the second avatar 1721 and a counterpart of the third avatar 1712, in response to detecting that the third avatar 1712 is positioned at a location adjacent to the second GUI 1720. FIG. 17 illustrates an embodiment in which only the third avatar 1712 is added to the second GUI 1720, but the number of avatars added to the second GUI 1720 is not limited thereto.

According to an embodiment of the disclosure, as the third avatar 1712 is disposed at a location adjacent to the second GUI 1720, the AR device may provide a graphic effect such that the avatars 1712, 1721, and 1722 included in the second GUI 1720 express greeting each other.

Figure 18:
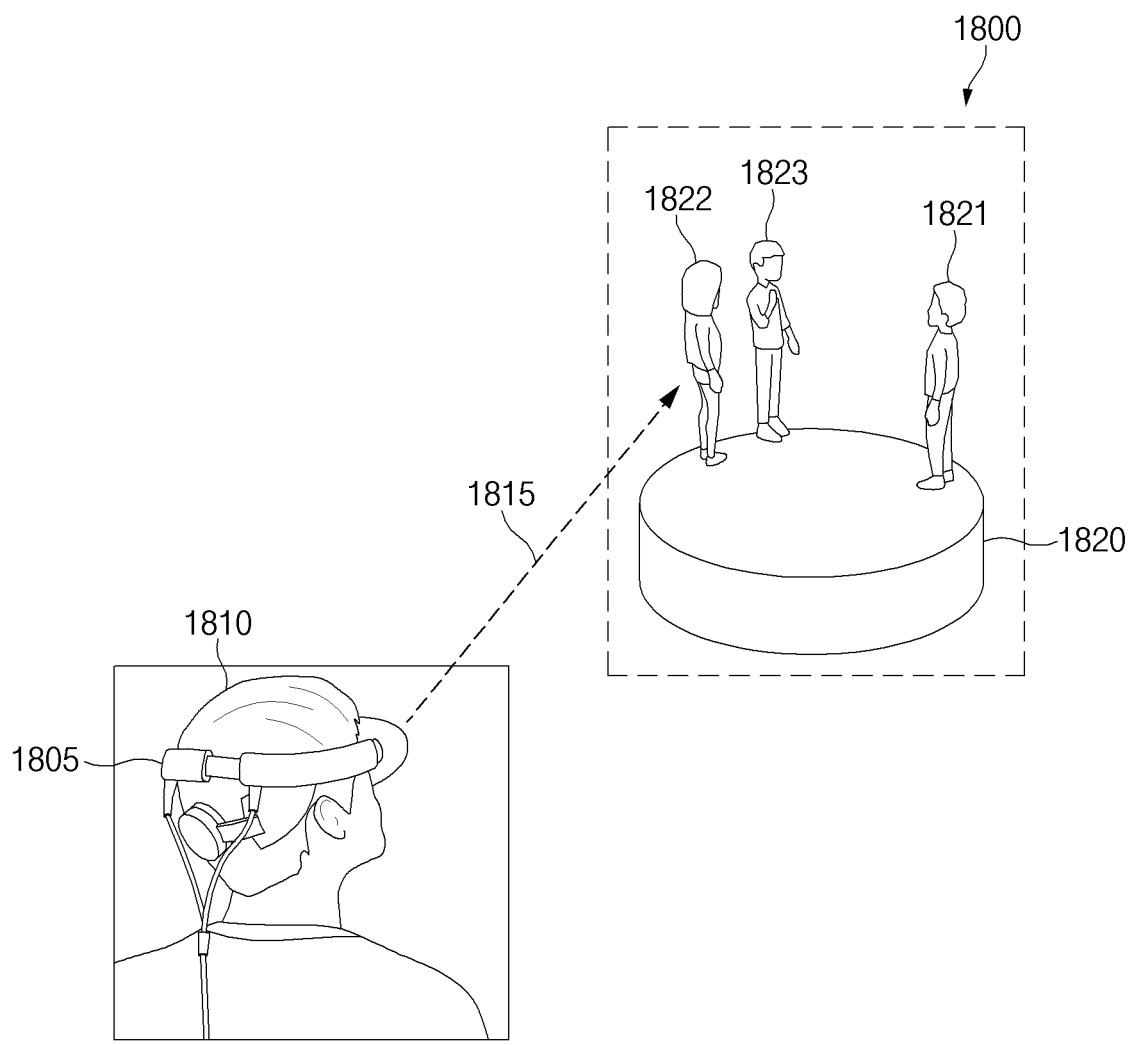
FIG. 18 illustrates an operation of selecting one of a plurality of avatars disposed on a second GUI according to an embodiment of the disclosure.

FIG. 18 illustrates an operation of selecting one of a plurality of avatars disposed on a second GUI according to an embodiment of the disclosure.

Referring to FIG. 18, an AR device 1805 (e.g., the AR device 610 in FIG. 6) may select one of remaining avatars 1822 and 1823 disposed on a second GUI 1820 other than a first avatar 1821 corresponding to a user account of the AR device 1805 in an AR 1800, based on a gaze direction of a user 1810 wearing the AR device 1805. For example, when a message input is obtained while a gaze direction 1815 of the user 1810 points to the second avatar 1822, it may be indicated that the obtained message input is used for a counterpart of a contact corresponding to the second avatar 1822.

Although not illustrated in FIG. 18, according to other embodiments of the disclosure, the AR device 1805 may select the second avatar 1822 among the avatars 1822 and 1823, in response to obtaining a user voice for calling an identifier or name of the second avatar 1822, or detecting that a finger of the user 1810 points to the second avatar 1822.

Figure 19:
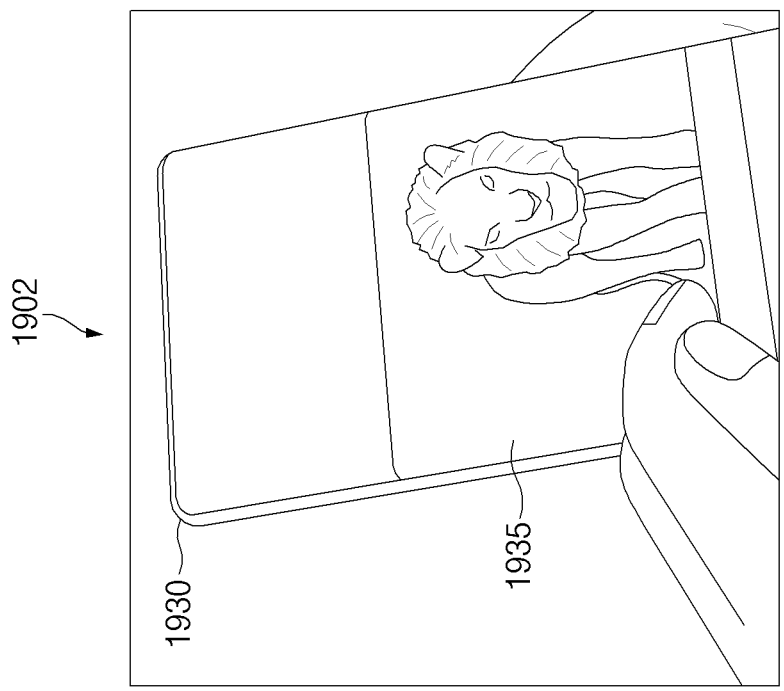
FIG. 19 illustrates an operation of sharing content in an AR according to an embodiment of the disclosure.
Figure 19:
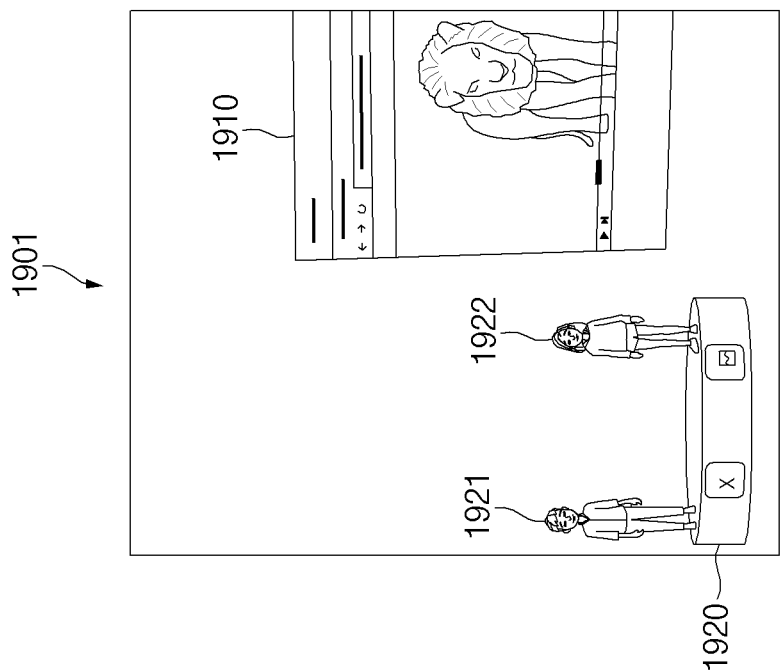

FIG. 19 illustrates an operation of sharing content in an AR according to an embodiment of the disclosure.

Referring to FIG. 19, while a second GUI 1920 (e.g., the second GUI 1820 in FIG. 18) including a first avatar 1921 and a second avatar 1922 is displayed, an AR system may obtain a user input for sharing content in an AR. For example, the content may include at least one of an image, a video, a link, a map, another person's contact, music, a file, a voice message, or a schedule.

For example, in operation 1901, the AR system may detect a user gesture of sharing content 1910 output in the AR. For example, the user gesture may include a gesture of grabbing the content 1910 and dropping the content 1910 on the second GUI 1920 similar to the principle described with reference to FIG. 10A.

As another example, in operation 1902, the AR system may obtain a user input for sharing content 1935 output on a touch screen of a user device 1930 (e.g., the user device 620 in FIG. 6) in the AR. For example, the user input may include a swipe input facing in a specific direction (e.g., upward) on the touch screen.

Figure 20:
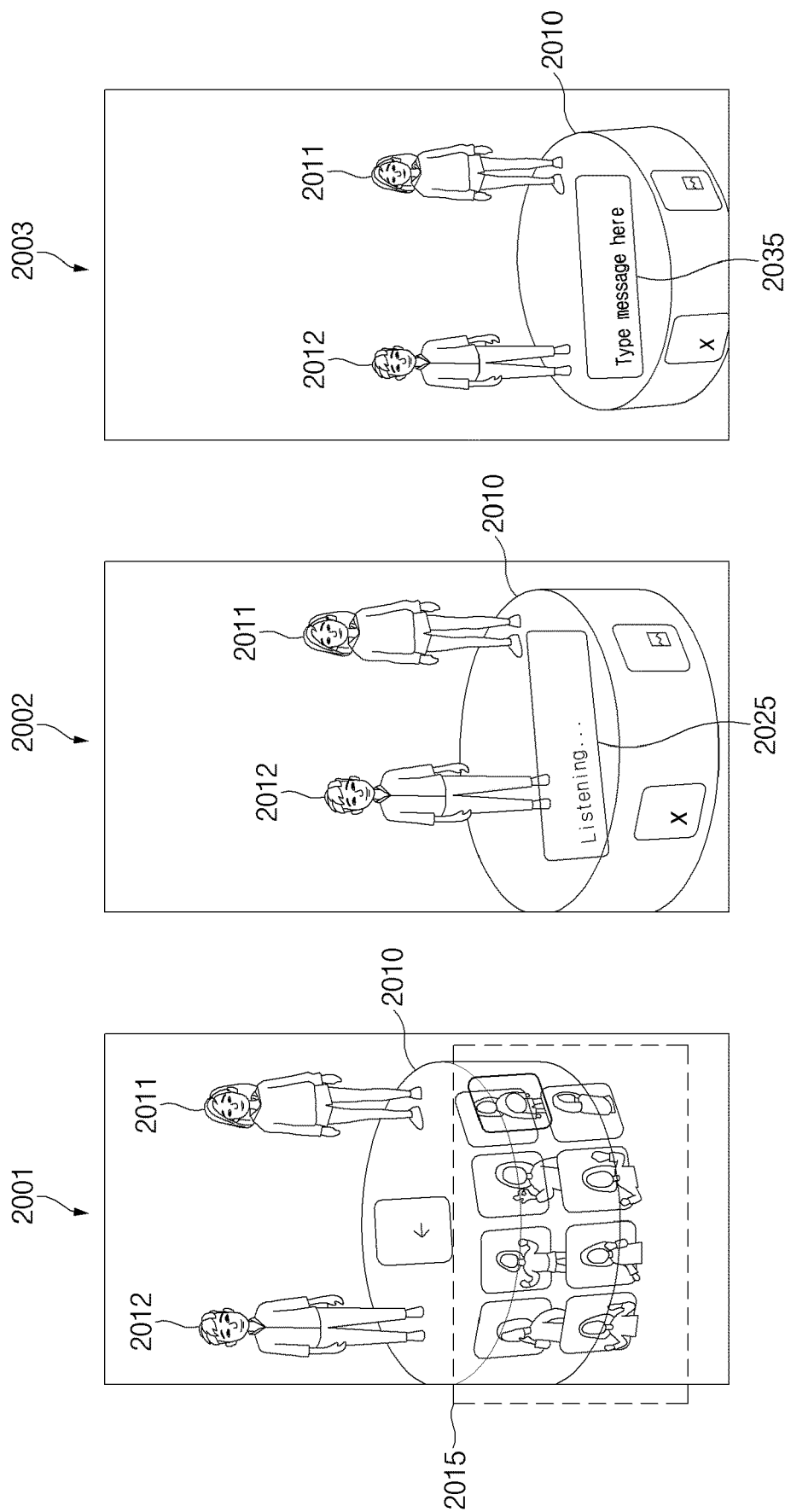
FIG. 20 illustrates an interaction scenario in a second GUI according to an embodiment of the disclosure.

FIG. 20 illustrates an interaction scenario in a second GUI according to an embodiment of the disclosure.

Referring to FIG. 20, it is assumed that a second GUI 2010 including a first avatar 2011 and a second avatar 2012 is displayed in an AR. Operation 2001 to operation 2003 are not implemented in order and may be performed independently.

Referring to FIG. 20, in operation 2001, an AR device (e.g., the AR device 610 in FIG. 6) may express a user's emotion through a first avatar 2011 corresponding to a user account. For example, the AR device may display a UI 2015 for selecting various gestures of the first avatar 2011, and may control the first avatar 2011 to express a gesture selected in the UI 2015.

In operation 2002, the AR device may display a UI 2025 indicating that a voice message is being output while the voice message received from a counterpart of a contact corresponding to the second avatar 2012 is being output.

In operation 2003, the AR device may display an input window 2035 in the AR such that a user is capable of identifying an obtained message input.

Figure 21:
FIG. 21 illustrates an image including an avatar according to an embodiment of the disclosure.

FIG. 21 illustrates an image including avatars according to an embodiment of the disclosure.

Referring to FIG. 21, an AR device may provide an image 2110 of avatars 2111, 2112, 2113, or 2114 included in a second GUI (e.g., the second GUI 2010 of FIG. 20). The number of avatars included in the image 2110 is not limited to the example illustrated in FIG. 21. For example, the AR device may generate the image 2110 in response to a user input for requesting image capture.

As described above, according to various embodiments of the disclosure, an AR device (e.g., the AR device 501 of FIG. 5) supporting an AR may include a display (e.g., the display 560 of FIG. 5), a communication circuit (e.g., the communication interface 540 of FIG. 5), a processor (e.g., the processor 570 of FIG. 5) operatively connected to the display and the communication circuit, and a memory (e.g., the memory 520 of FIG. 5) operatively connected to the processor. The memory may store instructions that, when executed, cause the processor to establish a connection with a user device (e.g., the user device 301 of FIG. 3) storing a contact application and a message application, through the communication circuit, to detect that the message application is executed, and to display a first GUI (e.g., 30 of FIG. 1) and at least one avatar (e.g., 32, 34, or 36 of FIG. 1), which is disposed at a location adjacent to the first GUI and corresponds to at least one contact associated with the contact application or the message application, through the display in the AR.

According to an embodiment of the disclosure, the instructions may cause the processor to display a second GUI (e.g., the second GUI 920 of FIG. 9), which indicates a message thread of the message application and is disposed at a location spaced from the first GUI, and a first avatar (e.g., the first avatar 922 of FIG. 9), which is disposed at a location adjacent to the second GUI and which corresponds to a user account, through the display in the AR.

According to an embodiment of the disclosure, the AR device may further include at least one sensor (e.g., the sensor 550 of FIG. 5), a microphone (e.g., the input/output interface 530 of FIG. 5), and a speaker (e.g., the input/output interface 530 of FIG. 5). The instructions may cause the processor to detect a first gesture for a second avatar (e.g., the second avatar 911 of FIG. 9) disposed at the location adjacent to the first GUI, through the at least one sensor, and to provide a graphic effect in which the second avatar moves from the first GUI to the second GUI, through the display in response to detecting the first gesture.

According to an embodiment of the disclosure, while the first avatar and the second avatar are displayed at the location adjacent to the second GUI, the instructions may cause the processor to receive a first user input for inputting a message by detecting a second gesture for a virtual keyboard (e.g., the virtual keyboard 1342 of FIG. 13B) displayed through the display through the at least one sensor, obtaining a user voice (e.g., the voice input 1341 of FIG. 13B) through the microphone, or receiving information from the user device or an accessory device through the communication circuit.

According to an embodiment of the disclosure, the instructions may cause the processor to display the message corresponding to the first user input on the first avatar through the display.

According to an embodiment of the disclosure, while the first avatar and the second avatar are displayed at the location adjacent to the second GUI, the instructions may cause the processor to receive a first message of the second avatar through the communication circuit and to output a voice corresponding to the first message through the speaker or to display a text including the first message on the second avatar through the display.

According to an embodiment of the disclosure, while the first avatar and the second avatar are displayed at the location adjacent to the second GUI, the instructions may cause the processor to detect a movement of the AR device through the at least one sensor, to determine whether the second GUI is positioned within a viewing area (e.g., the viewing area 1510 of FIG. 15A) of the display, in response to the detected movement, to display the text corresponding to the first message on the second avatar through the display based on the second GUI being positioned within the viewing area, or to output the voice corresponding to the first message through the speaker based on the second GUI being not positioned within the viewing area.

According to an embodiment of the disclosure, while the first avatar and the second avatar are displayed at the location adjacent to the second GUI, the instructions may cause the processor to detect a third gesture for a third avatar (e.g., the third avatar 1712 of FIG. 17) disposed at the location adjacent to the first GUI, through the at least one sensor and to provide a graphic effect in which the third avatar moves from the first GUI to the second GUI, in response to detecting the third gesture.

According to an embodiment of the disclosure, while the first avatar, the second avatar, and the third avatar are displayed at the location adjacent to the second GUI, the instructions may cause the processor to receive a second user input for selecting one of the second avatar and the third avatar by detecting a user gaze through the at least one sensor, obtaining a user voice through the microphone, or detecting a gesture through the at least one sensor.

According to an embodiment of the disclosure, while the first avatar and the second avatar are displayed at the location adjacent to the second GUI, the instructions may cause the processor to receive a second message of a fourth avatar (e.g., the third avatar 1612 of FIG. 16) disposed at the location adjacent to the first GUI, through the communication circuit and to provide a graphic effect indicating a movement of the fourth avatar through the display in response to receiving the second message.

According to an embodiment of the disclosure, while the message application is executed, the instructions may cause the processor to block execution of another application stored in the memory or to execute the other application in a background.

As described above, according to various embodiments of the disclosure, an AR system supporting an AR may include an AR device (e.g., the AR device 501 of FIG. 5) and a user device (e.g., the user device 301 of FIG. 3). The AR device may include a first display (e.g., the display 560 of FIG. 5) and a first communication circuit (e.g., the communication interface 540 of FIG. 5). The user device may include a second display (e.g., the touch screen 320 of FIG. 3), a second communication circuit (e.g., the communication circuit 350 of FIG. 3), a processor (e.g., the controller 330 of FIG. 3) operatively connected to the second display and the second communication circuit, and a memory (e.g., the memory 340 of FIG. 3) operatively connected to the processor. The memory may store at least one contact associated with a message application or a contact application. The memory may store instructions that, when executed, cause the processor to establish a connection with the AR device through the second communication circuit, to detect that the message application is executed, to render a first GUI (e.g., 30 of FIG. 1) and at least one avatar (e.g., 32, 34, or 36 of FIG. 1), which are to be displayed in the AR through the first display, as a 3 dimensional (3D) image, and to transmit the rendered first GUI and the rendered at least one avatar to the AR device through the second communication circuit. The at least one avatar may correspond to the at least one contact.

According to an embodiment of the disclosure, the instructions may cause the processor to render a second GUI (e.g., the second GUI 920 of FIG. 9) and a first avatar (e.g., the first avatar 922 of FIG. 9), which are to be displayed in the AR through the first display, as the 3D image and to transmit the rendered second GUI and the rendered first avatar to the AR device through the second communication circuit. The second GUI may indicate a message thread of the message application and is disposed at a location spaced from the first GUI. The first avatar may be disposed at a location adjacent to the second GUI and corresponds to a user account.

According to an embodiment of the disclosure, the AR system may further include at least one sensor (e.g., the sensor 550 of FIG. 5) detecting a gesture of a user, a microphone (e.g., the input module 250 of FIG. 2 or the input/output interface 530 of FIG. 5), and a speaker (e.g., the sound output module 255 of FIG. 2 or the input/output interface 530 of FIG. 5). The instructions may cause the processor to detect a first gesture for a second avatar (e.g., the second avatar 911 of FIG. 9) disposed at a location adjacent to the first GUI, through the at least one sensor, to render a first graphic effect in which the second avatar moves from the first GUI to the second GUI, in response to detecting the first gesture, and to transmit the rendered first graphic effect to the AR device through the second communication circuit.

According to an embodiment of the disclosure, the instructions may cause the processor to receive a first user input for inputting a message by receiving a text input through a virtual keyboard displayed on the second display or obtaining a user voice through the microphone.

According to an embodiment of the disclosure, the instructions may cause the processor to render the message corresponding to the first user input as the 3D image to be displayed in the AR through the first display and to transmit the rendered message to the AR device through the second communication circuit.

According to an embodiment of the disclosure, the instructions may cause the processor to receive a first message through the second communication circuit and to output a voice corresponding to the first message through the speaker or to render a text including the first message so as to be displayed in the AR through the first display.

According to an embodiment of the disclosure, the instructions may cause the processor to block execution of another application stored in the memory or to execute the other application in a background, while the message application is executed.

According to an embodiment of the disclosure, the instructions may cause the processor to detect a third gesture for a third avatar disposed at the location adjacent to the first GUI, through the at least one sensor, to render a second graphic effect in which the third avatar moves from the first GUI to the second GUI, in response to detecting the third gesture, and to transmit the rendered second graphic effect to the AR device through the second communication circuit.

According to an embodiment of the disclosure, the instructions may cause the processor to receive a second user input for selecting one of the second avatar and the third avatar by detecting a user gaze through the at least one sensor, obtaining a user voice through the microphone, or detecting a gesture through the at least one sensor.

According to an embodiment of the disclosure, the instructions may cause the processor to receive a second message of a fourth avatar disposed at the location adjacent to the first GUI, through the second communication circuit, to render a third graphic effect indicating a movement of the fourth avatar in response to receiving the second message, and to transmit the rendered third graphic effect to the AR device through the second communication circuit.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. An electronic device according to an embodiment of this specification may not be limited to the above-described electronic devices.

Various embodiments of the disclosure and terms used herein are not intended to limit the technical features described in the disclosure to specific embodiments of the disclosure, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", or "circuit". The "module" may be a minimum unit of an integrated part or may be a minimum unit of the part for performing one or more functions or a part thereof. For example, according to an embodiment of the disclosure, the module may be implemented in the form of an application-specific integrated circuit (ASIC).

Various embodiments of the disclosure may be implemented with software (e.g., the program 240) including one or more instructions stored in a storage medium (e.g., an embedded memory 236 or an external memory 238) readable by a machine (e.g., the electronic device 201). For example, the processor (e.g., the processor 220) of the machine (e.g., the electronic device 201) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semi-permanently stored in the storage medium and the case where the data is stored temporarily. For example, the 'non-transitory storage medium' may include a buffer in which data is temporarily stored.

According to an embodiment of the disclosure, a method according to various embodiments disclosed herein may be provided to be included in a computer program product. The computer program product may be traded between a seller and a buyer as a product. The computer program product may be distributed in the form of a machine-readable storage medium (e.g., a compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product (e.g., a downloadable app) may be at least temporarily stored in the machine-readable storage medium, such as the memory of a manufacturer's server, an application store's server, or a relay server or may be generated temporarily.

According to various embodiments of the disclosure, each component (e.g., a module or a program) of the above-described components may include a single entity or a plurality of entities. According to various embodiments of the disclosure, one or more the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to various embodiments of the disclosure, operations executed by modules, programs, or other components may be executed by a successive method, a parallel method, a repeated method, or a heuristic method. Alternatively, at least one or more of the operations may be executed in another order or may be omitted, or one or more operations may be added.

According to the embodiments disclosed in this specification, an AR device may provide an environment in which a user is capable of naturally exchanging a message with a counterpart in an AR.

According to the embodiments disclosed in this specification, the AR device may provide an environment in which the user is capable of utilizing a message application of a user device without restriction of actions even while the user wears the AR device.

According to the embodiments disclosed in this specification, the AR device may display an execution screen of an application stored in the user device in a three-dimensional space.

Besides, a variety of effects directly or indirectly understood through the specification may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality (AR) device that supports an AR, the AR device comprising:
   a display;
   a communication circuit;
   at least one sensor;
   at least one processor operatively connected to the display, the communication circuit, and the at least one sensor; and
   a memory operatively connected to the at least one processor,
   wherein the memory stores instructions that, when executed, cause the at least one processor to:
      establish a connection with a user device storing a contact application and a message application, through the communication circuit,
      detect that the message application is executed,
      display a first graphic user interface (GUI) and at least one avatar, which is disposed at a location adjacent to the first GUI and corresponds to at least one contact associated with the contact application or the message application, through the display in the AR,
      display a second GUI, which indicates a message thread of the message application and is disposed at a location spaced from the first GUI, through the display in the AR, and
      based on detecting, through the at least one sensor, a first gesture of moving an avatar from the first GUI to the second GUI, display a message transmitted and received between the user device and another user device corresponding to the moved avatar through the display in the AR, and wherein the message is rendered as a 3 dimensional (3D) image.

2. The AR device of claim 1, wherein the instructions further cause the at least one processor to:
   display a first avatar, which is disposed at a location adjacent to the second GUI and which corresponds to a user account, through the display in the AR.

3. The AR device of claim 2,
wherein the instructions further cause the at least one processor to:
detect the first gesture for a second avatar disposed at the location adjacent to the first GUI, through the at least one sensor, and
provide a graphic effect in which the second avatar moves from the first GUI to the second GUI, through the display in response to detecting the first gesture.

4. The AR device of claim 3, further comprising:
a microphone,
wherein, while the first avatar and the second avatar are displayed at the location adjacent to the second GUI, the instructions further cause the at least one processor to:
receive a first user input for inputting a message by detecting a second gesture for a virtual keyboard displayed through the display through the at least one sensor, obtaining a user voice through the microphone, or receiving information from the user device or an accessory device through the communication circuit.

5. The AR device of claim 4, wherein the instructions further cause the at least one processor to:
display the message corresponding to the first user input on the first avatar through the display.

6. The AR device of claim 3, further comprising:
a speaker, and
wherein, while the first avatar and the second avatar are displayed at the location adjacent to the second GUI, the instructions further cause the at least one processor to:
receive a first message of the second avatar through the communication circuit, and
output a voice corresponding to the first message through the speaker, or display a text including the first message on the second avatar through the display.

7. The AR device of claim 6, further comprising:
a speaker,
wherein, while the first avatar and the second avatar are displayed at the location adjacent to the second GUI, the instructions further cause the at least one processor to:
detect a movement of the AR device through the at least one sensor,
determine whether the second GUI is positioned within a viewing area of the display, in response to the detected movement,
display the text corresponding to the first message on the second avatar through the display, based on the second GUI being positioned within the viewing area, or
output the voice corresponding to the first message through the speaker, based on the second GUI being not positioned within the viewing area.

8. The AR device of claim 3, wherein, while the first avatar and the second avatar are displayed at the location adjacent to the second GUI, the instructions further cause the at least one processor to:
detect a third gesture for a third avatar disposed at the location adjacent to the first GUI, through the at least one sensor, and
provide a graphic effect in which the third avatar moves from the first GUI to the second GUI, in response to detecting the third gesture.

9. The AR device of claim 8, further comprising:
a microphone,
wherein, while the first avatar, the second avatar, and the third avatar are displayed at the location adjacent to the second GUI, the instructions further cause the at least one processor to:
receive a second user input for selecting one of the second avatar or the third avatar by detecting a user gaze through the at least one sensor, obtaining a user voice through the microphone, or detecting a gesture through the at least one sensor.

10. The AR device of claim 3, wherein, while the first avatar and the second avatar are displayed at the location adjacent to the second GUI, the instructions further cause the at least one processor to:
receive a second message of a fourth avatar disposed at the location adjacent to the first GUI, through the communication circuit, and
provide a graphic effect indicating a movement of the fourth avatar through the display in response to receiving the second message.

11. The AR device of claim 9, wherein the instructions further cause the at least one processor to:
while the message application is executed, block execution of another application stored in the memory or execute the other application in a background.

12. An augmented reality (AR) system supporting an AR, the AR system comprising:
an AR device; and
a user device,
wherein the AR device includes:
a first display,
a first communication circuit, and
at least one sensor configured to detect a gesture of a user,
wherein the user device includes:
a second display,
a second communication circuit,
at least one processor operatively connected to the second display and the second communication circuit, and
a memory operatively connected to the at least one processor,
wherein the memory stores at least one contact associated with a message application or a contact application,
wherein the memory stores instructions that, when executed, cause the at least one processor to:
establish a connection with the AR device through the second communication circuit,
detect that the message application is executed,
render a first graphic user interface (GUI) and at least one avatar corresponding to the at least one contact, which are to be displayed in the AR through the first display, as a 3 dimensional (3D) image,
transmit the rendered first GUI and the rendered at least one avatar to the AR device through the second communication circuit,
render a second GUI, which is to be displayed in the AR through the first display, as a 3D image,
transmit the rendered second GUI to the AR device through the second communication circuit,
detect through the at least one sensor, a first gesture of moving an avatar from the first GUI to the second GUI,
render a message transmitted and received between the user device and another user device corresponding to the moved avatar, as a 3D image, and transmit the rendered message to the AR device through the second communication circuit, and wherein the second GUI indicates a message thread of the message application and is disposed at a location spaced from the first GUI.

13. The AR system of claim 12, wherein the instructions further cause the at least one processor to:

render a first avatar, which is to be displayed in the AR through the first display, as a 3D image, and transmit the rendered first avatar to the AR device through the second communication circuit, and wherein the first avatar is disposed at a location adjacent to the second GUI and corresponds to a user account.

14. The AR system of claim 13, wherein the instructions further cause the at least one processor to:

detect the first gesture for a second avatar disposed at a location adjacent to the first GUI, through the at least one sensor, render a first graphic effect in which the second avatar moves from the first GUI to the second GUI, in response to detecting the first gesture, and transmit the rendered first graphic effect to the AR device through the second communication circuit.

15. The AR system of claim 14, further comprising:

a microphone, wherein the instructions further cause the at least one processor to:

receive a first user input for inputting a message by receiving a text input through a virtual keyboard displayed on the second display or obtaining a user voice through the microphone.

16. The AR system of claim 15, further comprising:

a speaker, wherein the instructions further cause the at least one processor to:

render the message corresponding to the first user input as the 3D image to be displayed in the AR through the first display, and transmit the rendered message to the AR device through the second communication circuit.

17. The AR system of claim 14, further comprising:

a speaker, wherein the instructions further cause the at least one processor to:

receive a first message through the second communication circuit, and output a voice corresponding to the first message through the speaker or render a text including the first message so as to be displayed in the AR through the first display.

18. The AR system of claim 17, wherein the instructions further cause the at least one processor to:

while the message application is executed, block execution of another application stored in the memory or execute the other application in a background.

19. The AR system of claim 14, wherein the instructions further cause the at least one processor to:

detect a third gesture for a third avatar disposed at the location adjacent to the first GUI, through the at least one sensor, render a second graphic effect in which the third avatar moves from the first GUI to the second GUI, in response to detecting the third gesture, and transmit the rendered second graphic effect to the AR device through the second communication circuit.

20. The AR system of claim 19, further comprising:

a microphone, wherein the instructions further cause the at least one processor to:

receive a second user input for selecting one of the second avatar or the third avatar by detecting a user gaze through the at least one sensor, obtaining a user voice through the microphone, or detecting a gesture through the at least one sensor.

* * * * *